US008788344B2

(12) United States Patent
Berk

(10) Patent No.: US 8,788,344 B2
(45) Date of Patent: Jul. 22, 2014

(54) SYSTEM AND METHOD TO ANALYZE CALLS TO ADVERTISED TELEPHONE NUMBERS

(75) Inventor: Matthew Berk, Seattle, WA (US)

(73) Assignee: Marchex, Inc., Seattle, WA (US)

(*) Notice: Subject to any disclaimer, the term of this patent is extended or adjusted under 35 U.S.C. 154(b) by 0 days.

(21) Appl. No.: 13/603,283

(22) Filed: Sep. 4, 2012

(65) Prior Publication Data

US 2013/0094641 A1 Apr. 18, 2013

Related U.S. Application Data

(63) Continuation of application No. 12/829,375, filed on Jul. 1, 2010, now Pat. No. 8,259,915.

(51) Int. Cl.
G06Q 30/00 (2012.01)
H04M 15/00 (2006.01)
G06Q 30/02 (2012.01)
H04M 15/08 (2006.01)

(52) U.S. Cl.
CPC .............. H04M 15/00 (2013.01); G06Q 30/02 (2013.01); H04M 2215/0192 (2013.01); H04M 15/08 (2013.01)
USPC .................. 705/14.73; 705/14.51; 705/14.54; 379/114.13; 379/220.01

(58) Field of Classification Search
USPC .................. 379/111, 112.01, 112.08, 114.01, 379/114.03, 114.05, 114.09, 114.13, 379/121.01, 122, 127.01, 133, 134, 136, 379/139, 114.06, 220.01, 221.02; 370/352, 370/353, 354; 705/14.4, 14.49, 14.51, 705/14.54, 14.55, 14.67, 14.68, 14.73
See application file for complete search history.

(56) References Cited

U.S. PATENT DOCUMENTS

| 5,838,768 | A | 11/1998 | Sumar et al. |
| 5,937,390 | A * | 8/1999 | Hyodo ...................... 705/14.61 |
| 6,327,353 | B1 | 12/2001 | Fukuzawa et al. |
| 6,430,282 | B1 * | 8/2002 | Bannister et al. ........ 379/211.02 |
| 6,636,590 | B1 | 10/2003 | Jacob et al. |
| 6,704,403 | B2 | 3/2004 | Lurie et al. |

(Continued)

FOREIGN PATENT DOCUMENTS

| EP | 1775929 | 4/2007 |
| JP | 2009514351 | 4/2009 |
| KR | 20020029534 | 4/2002 |
| KR | 20020032656 | 5/2002 |

OTHER PUBLICATIONS

International Search Report and Written Opinion for International Application No. PCT/US11/42812, Mail Date Nov. 16, 2011, 7 pages.

(Continued)

Primary Examiner — Binh Tieu
(74) Attorney, Agent, or Firm — Perkins Coie LLP

(57) ABSTRACT

A system and method for analyzing information associated with voice calls placed during a telephone number advertising campaign is described. The system receives information characterizing voice calls to advertiser telephone numbers and information from advertisers such as information about the outcome of the voice call (e.g., conversion information). The system correlates the voice call information with the advertiser information and generates reports based on the correlated information. The system can perform or enable the performance of other actions based on the correlated information. For example, the system may modify an ongoing advertising campaign based on an analysis of the correlated information.

24 Claims, 16 Drawing Sheets

(56) References Cited

U.S. PATENT DOCUMENTS

| | | |
|---|---|---|
| 6,801,899 B2 | 10/2004 | Lauffer |
| 6,865,540 B1 | 3/2005 | Faber et al. |
| 6,882,722 B2 | 4/2005 | Gilbert et al. |
| 6,990,187 B2 | 1/2006 | MacNamara et al. |
| 7,120,235 B2 | 10/2006 | Altberg et al. |
| 7,233,656 B2 | 6/2007 | Bedingfield, Sr. |
| 7,308,422 B1 | 12/2007 | Faber et al. |
| 7,359,498 B2 | 4/2008 | Faber et al. |
| 7,519,170 B2 | 4/2009 | Faber et al. |
| 7,698,183 B2 | 4/2010 | Faber et al. |
| 7,873,536 B2 | 1/2011 | Desikan et al. |
| 7,876,886 B2 | 1/2011 | Altberg et al. |
| 7,882,045 B1 | 2/2011 | Cole et al. |
| 7,886,009 B2 | 2/2011 | Faber et al. |
| 7,920,482 B2 | 4/2011 | Calahan et al. |
| 7,979,308 B2 | 7/2011 | Ho et al. |
| 8,024,224 B2 | 9/2011 | Faber et al. |
| 8,027,898 B2 | 9/2011 | Faber et al. |
| 8,117,064 B2 | 2/2012 | Bourne et al. |
| 8,125,931 B2 | 2/2012 | Faber et al. |
| 8,140,392 B2 | 3/2012 | Altberg et al. |
| 8,209,225 B2 | 6/2012 | Altberg et al. |
| 8,259,915 B2 | 9/2012 | Berk |
| 8,510,157 B2 * | 8/2013 | Kothari et al. ............... 705/14.1 |
| 2005/0256766 A1 | 11/2005 | Garcia et al. |
| 2006/0188081 A1 | 8/2006 | Hooper et al. |
| 2007/0078717 A1 | 4/2007 | Ho et al. |
| 2007/0086584 A1 | 4/2007 | Rossini |
| 2007/0112656 A1 | 5/2007 | Howe et al. |
| 2007/0130014 A1 * | 6/2007 | Altberg et al. .................. 705/14 |
| 2007/0162296 A1 | 7/2007 | Altberg et al. |
| 2007/0174124 A1 | 7/2007 | Zagofsky et al. |
| 2007/0189473 A1 | 8/2007 | Altberg et al. |
| 2007/0198323 A1 | 8/2007 | Bourne et al. |
| 2007/0287488 A1 | 12/2007 | Faber et al. |
| 2007/0291783 A1 | 12/2007 | Faber et al. |
| 2008/0052353 A1 | 2/2008 | Faber et al. |
| 2008/0086384 A1 | 4/2008 | Srinivasan et al. |
| 2008/0091516 A1 | 4/2008 | Giunta |
| 2008/0194260 A1 | 8/2008 | Altberg et al. |
| 2008/0275785 A1 | 11/2008 | Altberg et al. |
| 2008/0292070 A1 * | 11/2008 | Winter et al. .............. 379/88.14 |
| 2008/0313083 A1 | 12/2008 | Altberg et al. |
| 2009/0055251 A1 | 2/2009 | Shah et al. |
| 2009/0067599 A1 | 3/2009 | Agarwal et al. |
| 2009/0147778 A1 | 6/2009 | Wanless et al. |
| 2009/0154674 A1 | 6/2009 | Chu |
| 2009/0323674 A1 | 12/2009 | Wunsch |
| 2009/0325547 A1 * | 12/2009 | Nath et al. .................. 455/414.1 |
| 2011/0225015 A1 * | 9/2011 | Spivack et al. ............... 705/7.24 |
| 2011/0255015 A1 * | 10/2011 | Kasai ............................ 348/739 |
| 2012/0002664 A1 | 1/2012 | Berk |
| 2012/0002799 A1 | 1/2012 | Berk |
| 2012/0004978 A1 * | 1/2012 | Kothari et al. ............. 705/14.42 |
| 2012/0059709 A1 | 3/2012 | Lieberman et al. |
| 2013/0332261 A1 * | 12/2013 | Kothari et al. ............. 705/14.42 |
| 2014/0025484 A1 * | 1/2014 | Altberg et al. ............. 705/14.45 |

OTHER PUBLICATIONS

International Search Report and Written Opinion for International Application No. PCT/US2011/042819, Mail Date Jan. 19, 2012, 11 pages.

International Search Report and Written Opinion for PCT/US2011/042792; Applicant: Marchex, Inc.; Date of Mailing: Sep. 26, 2011, 11 pages.

Non-Final Office Action for U.S. Appl. No. 12/829,375, Mail Date Jan. 6, 2012, 20 pages.

Notice of Allowance for U.S. Appl. No. 12/829,375, Mail Date Jun. 26, 2012, 1 Page.

Final Office Action for U.S. Appl. No. 12/829,373, Mail Date Jul. 19, 2013, 17 pages.

U.S. Appl. No. 13/874,333, filed Apr. 30, 2013, Berk.

Non-Final Office Action for U.S. Appl. No. 12/829,373, Mail Date Dec. 24, 2012, 23 pages.

* cited by examiner

Figure 2B:
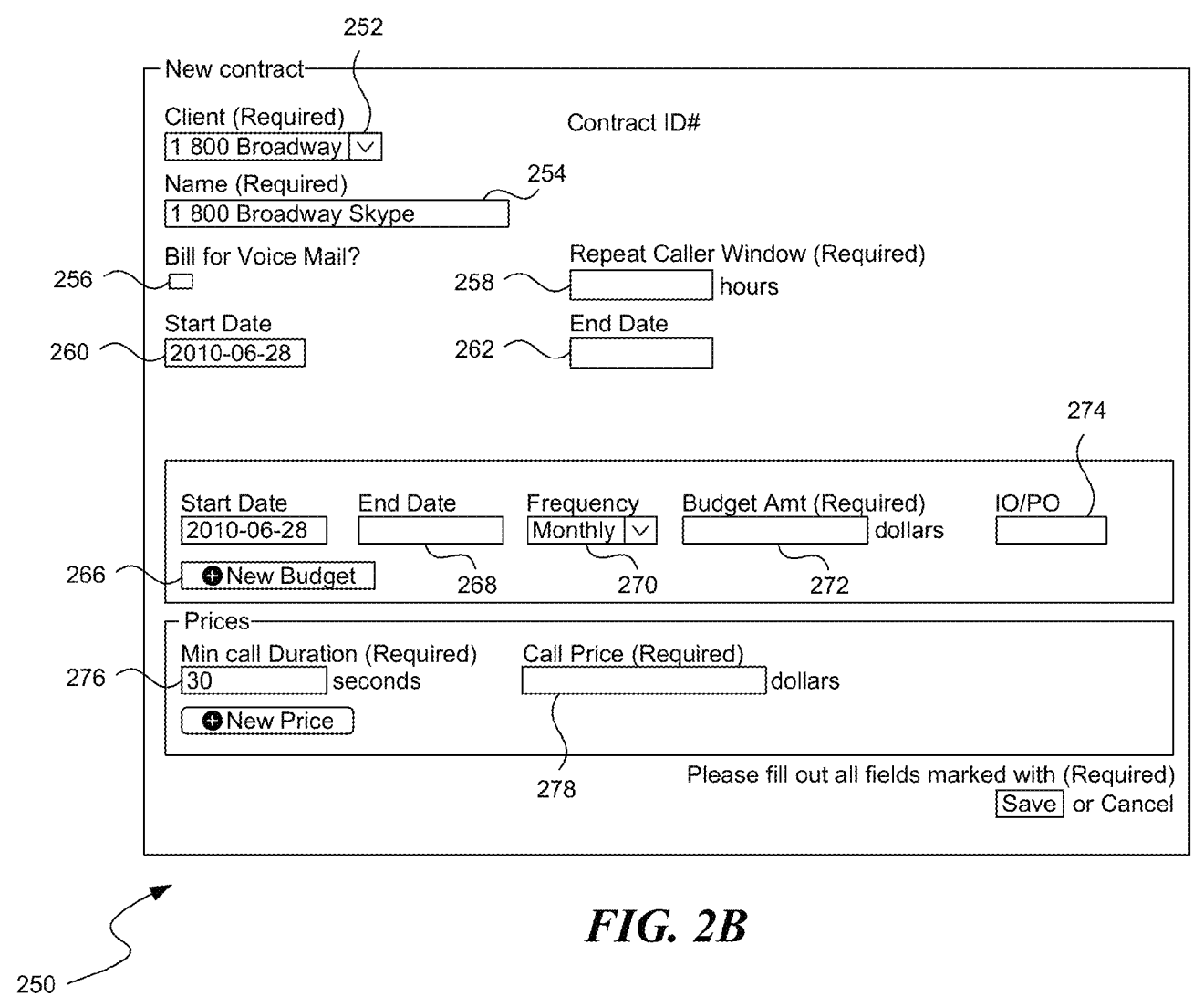

New contract

Client (Required) — 252
1 800 Broadway ⌄

Contract ID#

Name (Required) — 254
1 800 Broadway Skype

Bill for Voice Mail? ☐ — 256

Repeat Caller Window (Required)
[____] hours — 258

Start Date
2010-06-28 — 260

End Date — 262

Start Date
2010-06-28

End Date [____] — 268

Frequency
Monthly ⌄ — 270

Budget Amt (Required)
[____] dollars — 272

IO/PO
[____] — 274

⊕ New Budget

Prices

Min call Duration (Required)
30 seconds — 276

Call Price (Required)
[____] dollars — 278

⊕ New Price

Please fill out all fields marked with (Required)
[Save] or Cancel

(12)  United States Patent

SYSTEM AND METHOD TO ANALYZE CALLS TO ADVERTISED TELEPHONE NUMBERS

CROSS-REFERENCE TO RELATED APPLICATIONS

This application is a continuation of, and incorporates by reference in its entirety, U.S. patent application Ser. No. 12/829,375 entitled SYSTEM AND METHOD TO ANALYZE CALLS TO ADVERTISED TELEPHONE NUMBERS, filed Jul. 1, 2010, which is related to U.S. patent application Ser. No. 12/829,372, entitled SYSTEM AND METHOD TO DIRECT TELEPHONE CALLS TO ADVERTISERS, filed Jul. 1, 2010, and U.S. patent application Ser. No. 12/829,373, entitled SYSTEM AND METHOD FOR CALLING ADVERTISED TELEPHONE NUMBERS ON A COMPUTING DEVICE, filed Jul. 1, 2010, each of which is incorporated herein by reference in its entirety.

BACKGROUND

A telecommunications provider that has a proprietary telecommunications network, such as a wireless telecommunications provider or a public switched telephone network (PSTN) telecommunications provider, typically charges a person to make a voice call using the proprietary telecommunications network. The telecommunications provider may charge the person on a per-minute basis, decrement a number of minutes available to the person, or use other billing methods to charge the person for the voice call.

To escape such costs, many persons use voice communications software to make voice calls to other persons using compatible voice communications software. Such voice communications software typically routes voice calls over open or non-proprietary communications networks, such as the Internet. One example of such voice communications software is SKYPE. A person utilizing an electronic device on which Skype is installed, such as a personal computer, can make voice calls to other persons using electronic devices on which Skype is also installed. Typically, neither the originator of the Skype voice call nor the recipient of the Skype voice call is charged for the cost of the Skype voice call (the originator can call the recipient for free using Skype).

Skype also allows persons to make voice calls to non-Skype telephone numbers. For example, a Skype user can make a voice call that terminates on a proprietary telecommunications network, such as to a telephone number provided or controlled by a telecommunications provider having a proprietary telecommunications network. Similar voice communications software typically provides the same functionality. However, Skype typically charges the user to make a voice call to a non-Skype telephone number. In other words, a Skype user can call another person's mobile phone, landline phone, or other non-Skype device, but the Skype user is charged a non-zero amount to their Skype account for the call (for example, several cents a minute).

Oftentimes, a Skype user does not have funds or credit in their Skype account to pay for the voice call to the non-Skype telephone number, and therefore does not even consider making the voice call to a non-Skype telephone number. Even if the Skype user does have enough funds or credit to make the voice call, the cost may deter the Skype user from making the voice call. These and other factors may hamper Skype users from using Skype to contact businesses or services that they might otherwise consider using. Other voice communications software typically follows a similar business model, and accordingly users of other voice communications software may be similarly deterred from making voice calls for which they would normally have to pay.

The need exists for systems and methods that overcome the above problems, as well as provide additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 2B is an example interface that can be used to provide details about an advertising campaign.

DETAILED DESCRIPTION

Figure 1A:
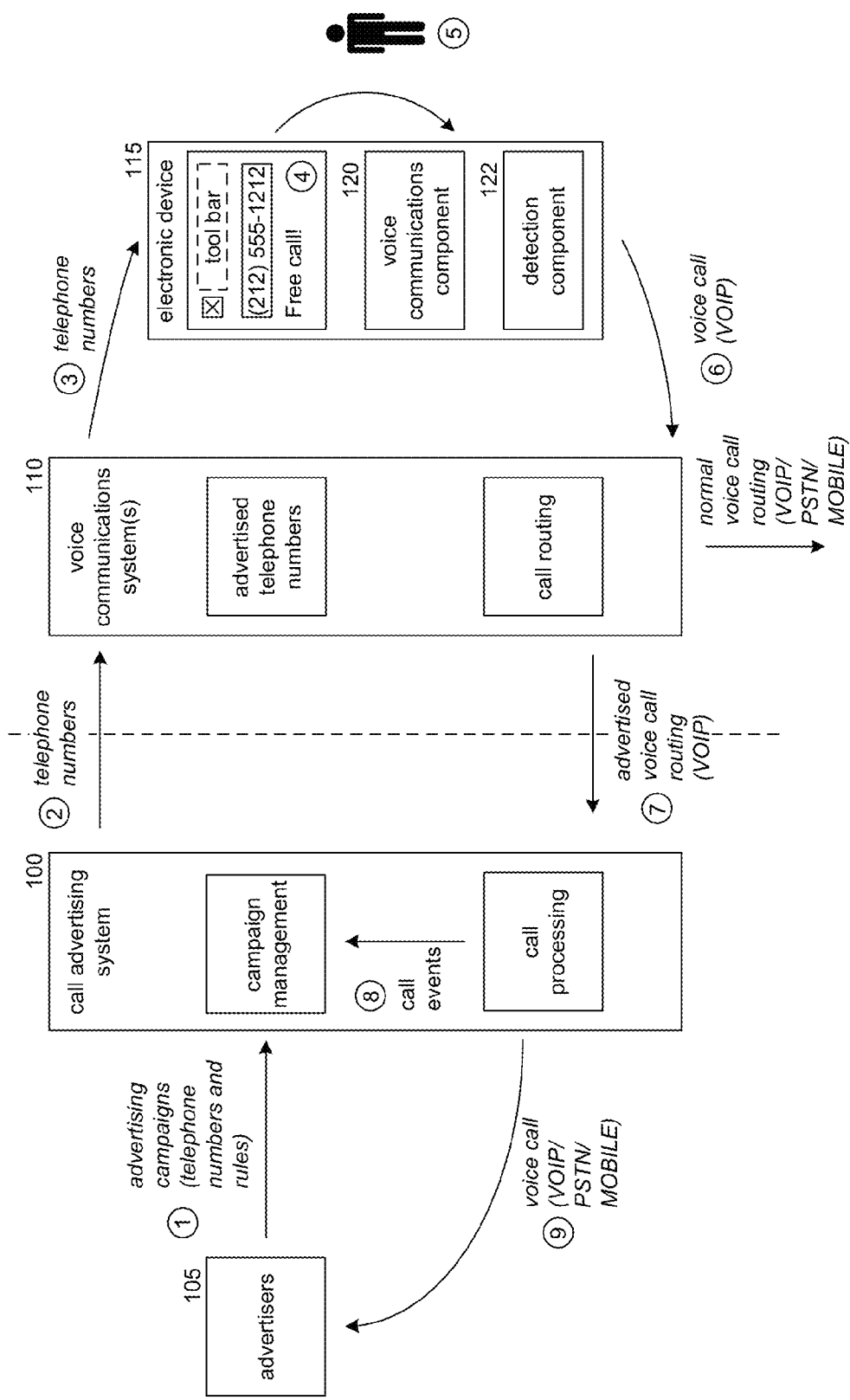
FIG. 1A is a block diagram illustrating an exemplary environment in which a call advertising system can operate.

A system and method that allows advertisers to offer to pay for calls made to advertiser telephone numbers, and which subsequently detects telephone numbers of advertisers on a user's electronic device and redirects telephone calls to those numbers to the corresponding advertiser, is described herein. The call advertising system receives parameters of an advertising campaign from an advertiser, such as one or more phone numbers in the campaign, an amount per call that the advertiser is willing to pay, a time period for the campaign, an overall budget for the campaign, and so on. The call advertising system transmits an indication of the advertised phone numbers to a voice communication system.

The voice communication system, upon determining that a campaign phone number is contained in electronic content being displayed to a user, appropriately highlights the phone number. The highlighting indicates to users that the call can be made at a free or reduced rate to what a user would normally pay in order to make such a call. In some embodiments, the electronic device does not display an indication of a lower cost to make a voice call to the advertiser telephone. The user may only learn at a later time (e.g., by reviewing their bill) that the voice call was at a free or reduced rate. In some cases, the electronic device only displays the indication of the lower cost during a voice call initiation process or after the user has initiated the voice call. The user may therefore become aware of the fact that the call is at a free or reduced rate when the voice call is placed or during the call. Learning that the call is at a free or reduced rate may encourage the user to stay on the voice call longer than the user normally would have.

Upon receiving a selection of the phone number by a user of the voice communications system, the system redirects the call to the call advertising system. The call advertising system charges the associated advertiser for the call in accordance with the advertising campaign parameters and routes the call to the advertiser. The call advertising system thereby allows advertisers to advertise in a fashion that directly increases the number of calls that they receive for advertised goods or services. Since telephone calls are more likely to result in a sale of goods or services than web traffic generated by keyword or banner advertisements, the call advertising system disclosed herein provides significant benefit to advertisers.

In some embodiments, the call advertising system may qualify the telephone call before routing the call to the advertiser. For example, the call advertising system may review information associated with the call, such as information identifying the user that placed the call, an identity of a web page on which the phone number was viewed when the number was selected, or the content that was being viewed when the number was selected. The call advertising system may connect the call to the phone number based on the reviewed information, such as by connecting the call to an extension associated with a specific service provided by an entity that created an advertising campaign involving the phone number.

In circumstances in which the call advertising system and voice communication system are operated by different parties, the operator of the voice communications system may be paid for having routed calls to the call advertising system. Payment may be made to the operator of the voice communication system on a per-call basis, and may be calculated, for example, based on a flat per-call fee agreement, a percentage of advertising revenue received from an advertiser, or on other financial terms.

In some embodiments, the call advertising system tracks metrics associated with each routed call and generates statistical information that may be used by the advertiser to improve their handling of calls. The tracked metrics may include information such as source of call and length of call, and may be correlated with conversion data provided by the advertiser to ascertain overall performance of the particular advertising campaign.

It will be appreciated that consumers benefit from the call advertising system since for a user to call an advertiser is free or lower than the cost normally would be. Accordingly, the cost to the user to make a voice call is at least partially subsidized, although the user may be unaware of such a subsidy. When subsidized, it has been found that users are more likely to call advertisers.

Various examples of the call advertising technology will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable Systems

FIG. 1A is a block diagram illustrating a representative environment in which a call advertising system 100 operates. The call advertising system 100 receives information characterizing advertising campaigns for phone numbers from advertisers 105. As will be described herein, at its simplest an advertising campaign is an indication of a telephone number and a price that an advertiser is willing to pay to receive a call from a potential customer via that telephone number. As used herein, the term "advertiser" is intended to refer to any entity that can provide a telephone number to the call advertising system 100, and not merely to entities that advertise goods, services, and/or other items. Accordingly, advertisers include businesses (for example, retailers, manufacturers, service providers, etc.), governments, administrative agencies, as well as individual persons. Also as used herein, the term "advertising" is intended to refer to any display or entry of an advertiser telephone number, with a subsequent routing of a call to the advertiser telephone number in a manner that obligates the advertiser to pay for the call. A display of an advertiser telephone number may occur in combination with the display of an indication that a cost to make a voice call to the advertiser telephone number is lower than the cost normally would be in the absence of the agreement to pay for receiving the call provided by the advertiser.

The call advertising system 100 is in communication with a voice communications system 110. The call advertising system 100 utilizes the voice communications system 110 to promote the calling of advertiser telephone numbers by subsidizing, sponsoring, and/or paying for the costs of persons to place voice calls to the advertiser telephone numbers using the voice communications system. The voice communications system 110 can be associated with or provided by a telecommunications provider, and is typically a voice over IP (VoIP) service such as SKYPE or VONAGE. The voice communications system may also be, however, a traditional circuit-switched or other connection that is provided by a mobile telecommunications provider such as VERIZON or a PSTN service provider such as QWEST, etc. On a periodic or continuous basis, the call advertising system 100 provides the voice communication system 110 with the set of telephone numbers that are currently part of an active advertising campaign, or in the future will be a part of an advertising campaign. When the call advertising system 100 provides a set of telephone numbers associated with future advertising campaigns, the call advertising system also provides an indication of when the future advertising campaign will become effective.

The voice communication system 110 provides the telephone numbers that are part of an advertising campaign to a user's electronic device 115. A user's electronic device may be a mobile phone, a laptop or desktop computer, a landline phone, or any other another electronic device having a voice communications component 120 that enables the user to make voice calls that are routed by the voice communications system. That is, the voice communications component 120 allows a user of the electronic device to establish a connection, such as a voice over IP (VoIP) connection, via the voice communication system. The electronic device also contains a detection component 122 that detects advertised telephone numbers in content being displayed to a user and highlights the telephone numbers to the user. The detection component 122 also detects advertised telephone numbers that are entered by a user. The telephone numbers may be periodically or continuously downloaded to the detection component 122. The detection component 122 therefore manages the received telephone numbers that are part of advertising campaigns. Alternatively, as will be described in additional detail herein, the detection component 122 may query the voice communications system 110 when a telephone number is to be displayed to a user on the electronic device 115 in order to determine whether the telephone number should be highlighted to the user. While the voice communications component 120 and detection component 122 are depicted as different components, it will be appreciated that the operation of the two components may be closely linked or the functionality of the two components combined into a single component.

As a user operates the electronic device 115 to navigate electronic content, the user may be displayed content that contains a telephone number that is part of an active advertising campaign. When the detection component 122 detects that the user's electronic device is displaying an advertiser telephone number that is part of an active advertising campaign, the detection component 122 causes the electronic device to display an indication to the user that the cost to make a voice call to the advertiser telephone number using the voice communications component is less than the cost would typically be. For example, the detection component 122 can display an icon indicating that the user can make a free voice call to the displayed number. As another example, the detection component 122 can change the background of the displayed telephone number, display the telephone number in another color, underline the telephone number, or otherwise use graphical techniques or sounds to differentiate an advertised telephone number from a telephone number that is not currently part of an advertising campaign. As used herein, any graphical, textual, visual, haptic, or auditory technique used to indicate that the user can make a free or reduced-price call to the advertised telephone number will be referred to as "highlighting" the telephone number. The type of highlighting used by the detection component 122 to highlight a telephone number may be determined by the detection component. For example, the detection component 122 may use consistent highlighting techniques to provide a common user experience across different types of displayed content, or may vary the type of highlighting depending on the formatting of the content with which the highlighting is to be displayed (e.g., the telephone number may be bolded on pages primarily containing text, or circled in a bright color on pages primarily containing graphics). Alternatively, the type of highlighting used by the detection component 122 may be dictated by the advertiser when specifying the rules of an advertising campaign. When specified by an advertiser, the call advertising system 100 conveys the type of highlighting to use with advertiser telephone numbers when the telephone numbers are conveyed to the voice communication system 110 or the detection component 122.

In some embodiments, the electronic device 115 does not display an indication to a user of a lower cost to make a voice call to the advertiser telephone. The user may only learn at a later time (e.g., by reviewing their bill) that the voice call was at a free or reduced rate. In some cases, the electronic device 115 only displays the indication of the lower cost during the initiation of a voice call, or after the voice call has been initiated. The user may therefore become aware of the fact that the call is at a free or reduced rate when they enter the number to make the call, or are notified of the lesser rate during the voice call. By knowing that a call is at a free or reduced rate, the user may be encouraged to stay on the voice call longer than the user normally would have.

If the user decides to call the displayed advertiser telephone number, the voice communications component 120 initiates the voice call and routes it to the voice communications system 110. The voice communications system 110 determines that the voice call is to an advertised telephone number and routes the call to the call advertising system 100. Upon receipt of a call, the call advertising system 100 may perform one more operations based on the call. The call advertising system generates a call event to allow the routing of the call to be charged to the advertiser, provided that the circumstances of the call fall within the specified advertising campaign (e.g., the number of calls paid for has not been exhausted, the call falls within the specified time-period of the campaign, etc.). The call advertising system 100 may also provide one or more qualification checks on the call before routing to the advertiser. For example, the call may be routed differently depending on the caller identifier, the circumstances under which the user selected the number to call, any historical information characterizing the caller, any demographic information characterizing the caller, etc. The call advertising system 100 then routes the voice call to the advertiser telephone number.

By allowing advertisers to highlight their phone numbers on electronic content that is viewed by consumers, and by providing an economic incentive for consumers to select the highlighted phone numbers, the call advertising system allows advertisers to better use their advertising budget to develop leads that are more likely to result in conversion. The call advertising system thereby improves the efficiency of advertising dollars spent online over spending on traditional keyword or banner advertisements.

Figure 1B:
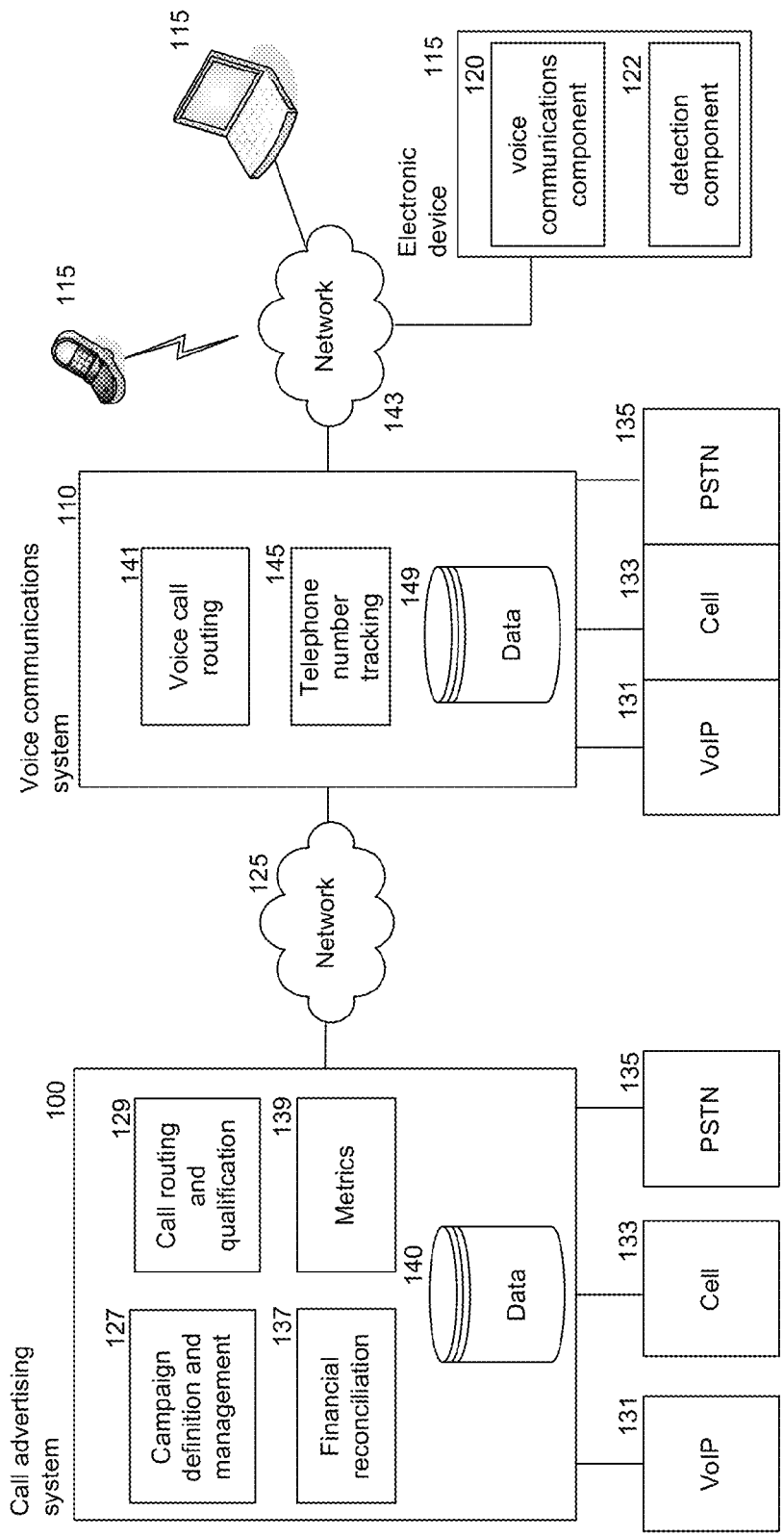
FIG. 1B is a block diagram illustrating components used in providing call advertising in conjunction with a voice communications system.

FIG. 1B is a block diagram illustrating various components in the call advertising system 100 and the voice communications system 110. The call advertising system 100 is in communication with the voice communications system 110 over a network 125, such as the Internet, an intranet, and/or any other suitable public or private telecommunications network (e.g., a PSTN network). The call advertising system 100 utilizes the voice communications system 110 to promote the calling of advertiser telephone numbers by subsidizing, sponsoring, and/or paying for the costs of persons to place voice calls to the advertiser telephone numbers using the voice communications system 110.

The call advertising system 100 includes various components used to implement the techniques described herein. The call advertising system 100 includes a campaign definition and management component 127 configured and/or programmed to receive telephone numbers and parameters associated with advertising the telephone numbers. The campaign component 127 enables advertisers to directly (e.g., via a web portal provided by the call advertising system 100) or indirectly (e.g., via a sales representative) input telephone numbers and criteria and/or rules used when defining an advertising campaign associated with a telephone number. The rules and/or criteria may include a total monetary amount, budget, or cap on the number of calls that may be paid for; a start time, a stop time, daily or weekly time periods in which calls may be paid for; a definition of dynamically-changing time periods based on traffic to the telephone number in which calls may be paid for; and so on. The campaign component 127 is configured and/or programmed to transmit information to the voice communications system 110, such as the received telephone numbers and optionally, the other campaign parameters, and to periodically update such information when, for example, a campaign for a particular telephone number ends.

The call advertising system 100 includes call routing and qualification components 129 configured and/or programmed to route calls received from the voice communications system 110 to advertisers. The calls may be routed to advertisers through a network 131 carrying VoIP traffic, a cellular telecommunications network 133, a public switched telephone network (PSTN) 135, and/or other networks. The calls may be routed or handled using various protocols, such as Extensible Messaging and Presence Protocol (XMPP), Session Initiation Protocol (SIP), and/or other current and future technologies. The call routing component 129 may apply one or more campaign rules before routing received calls. For example, the call routing component 129 may receive a voice call from the voice communications system 110 and directed to an advertiser telephone number on the PSTN network 135, may extract information (such as header information) from the voice call, and may connect the caller to a recipient associated with the advertiser telephone number based on the extracted information.

When calls are routed by the call advertising system 100, a financial reconciliation for the call routing occurs. The call advertising system 100 therefore includes a financial reconciliation component 137 that is configured and/or programmed to track the calls. The financial reconciliation component 137 is also configured to charge or bill advertisers for routed calls in accordance with the amount the advertisers have agreed to pay for the call. Charging, billing, and similar terms are intended to encompass financial procedures for accounting for the amount that the advertiser agreed to pay for the call. For example, the financial reconciliation component 137 may charge or bill an advertiser by debiting an account of the advertiser for each voice call routed to the advertiser. In addition, the reconciliation component 129 may track all advertising revenue and on a periodic basis provide an indication of amounts that should be paid to the operator of the voice communications system 110. Such a payment to the operator of the voice communications system may be made when, for example, the operator of the voice communications system is different than the operator of the call advertising system. Crediting, paying, and similar terms are intended to encompass financial procedures for allocating payments to the operator of the voice communications system 110. For example, the reconciliation component 137 may credit or pay the operator by crediting an account of the operator for routing the voice call. Payments to the operator of the voice communications system may be on a percent share of revenue basis, on a fixed-fee per call basis, or on any other financial terms that are agreed upon with the operator.

When calls are routed by the call advertising system 100, metrics associated with each call are tracked by a metrics component 139. The metrics component may track such metrics as call length, source of calls, distribution of calls throughout the day or day of the week, destination of calls, etc. As will be described in additional detail herein, the metrics component 139 generates reports that assist advertisers in optimizing their spend on telephone number advertising.

The call advertising system 100 also includes a data storage area 140 that stores information received, tracked, and generated by the call advertising system 100, such as information received by the campaign component 127, information received from the metrics component 139, information received from the financial reconciliation component 137, or other information. The call advertising system 100 may include other components (not shown), such as components configured and/or programmed to provide alerts with respect to use of advertised telephone numbers; components configured and/or programmed to allow communication and data exchange with advertisers and the voice communications system; or other components.

The voice communications system 110 includes various components to facilitate user communication as disclosed herein. A voice call routing component 141 is configured and/or programmed to connect or route calls placed by a user of an electronic device 115 to other parties. The voice call routing component 141 can route calls to a network 131 carrying VoIP traffic, a cellular telecommunications network 133, a PSTN network 135, or to the call advertising system 100 via network 125. The voice communications system 110 can also include a telephone number tracking component 145 configured and/or programmed to track those phone numbers that are currently part of an advertising campaign and provide such phone number to electronic devices 115. A data storage area 149 is provided to store information received, tracked, and generated by the voice communications system 110, such as information managed by the tracking component 145. The voice communications system 110 can also include other components (not shown), such as components that bill users of the voice communications system 110, components that track and generate usage information of the system, and so on.

An electronic device 115 may be coupled to the voice communications system 110 via wireless networks, wired networks, and/or other suitable networks 143. The electronic device includes any type of electronic device that is capable of displaying a phone number to a user and allowing the user to initiate a telecommunications session via that number. Electronic devices therefore include, but are not limited to, devices such as computers, mobile phones, smart phones, personal digital assistants (PDAs), tablet computers, media players, game devices, computers with microphones and speakers, traditional landline phones, and/or other suitable devices. As explained in more detail herein, electronic devices include a voice communications component 120 (as shown in FIG. 1) that initiates voice calls that are subsequently routed by the voice call routing component 141. The voice communications component 120 in the electronic device can be a plug-in or extension to a browser, another application that works in conjunction with a browser, or a stand-along application that allows a user to peruse content and establish telecommunication sessions.

The electronic device 115 also contains a detection component 122 that works in conjunction with the voice communications component 120. The detection component 122 is configured to review and identify phone numbers that are contained in electronic content, such as a web page, an email, a document, an instant message or other content that is displayed on the device to the user. The detection component 120 compares any identified phone numbers with those phone numbers that are part of a current advertising campaign. The campaign phone numbers may be stored on the electronic device, allowing the detection component to perform a local look-up to determine if an identified phone number is currently part of a campaign. Alternatively or additionally, the campaign phone numbers may be stored remotely from the electronic devices, such as by the telephone number tracking component 145 in the voice communications system 110. When the detection component 122 identifies a phone number in viewed electronic content, the component may therefore make a call to the tracking component 145 to determine if the number is contained in an active advertising campaign. If an identified telephone number is found to be part of an active campaign, the detection component 122 highlights the advertiser telephone number so that the user is able to readily understand that the cost to make a voice call to the telephone number is free or lower than it would typically be. To initiate a call to a number selected by a user, the voice communications component 120 can include subcomponents that convert analog voice signals to digital formats, subcomponents that compress digital signals into internet protocol (IP) packets, subcomponents that transmit IP packets over a network, subcomponents that decompress received packets, subcomponents that convert digital formats into analog voice signals, and other subcomponents that perform other functions.

Figure 1C:
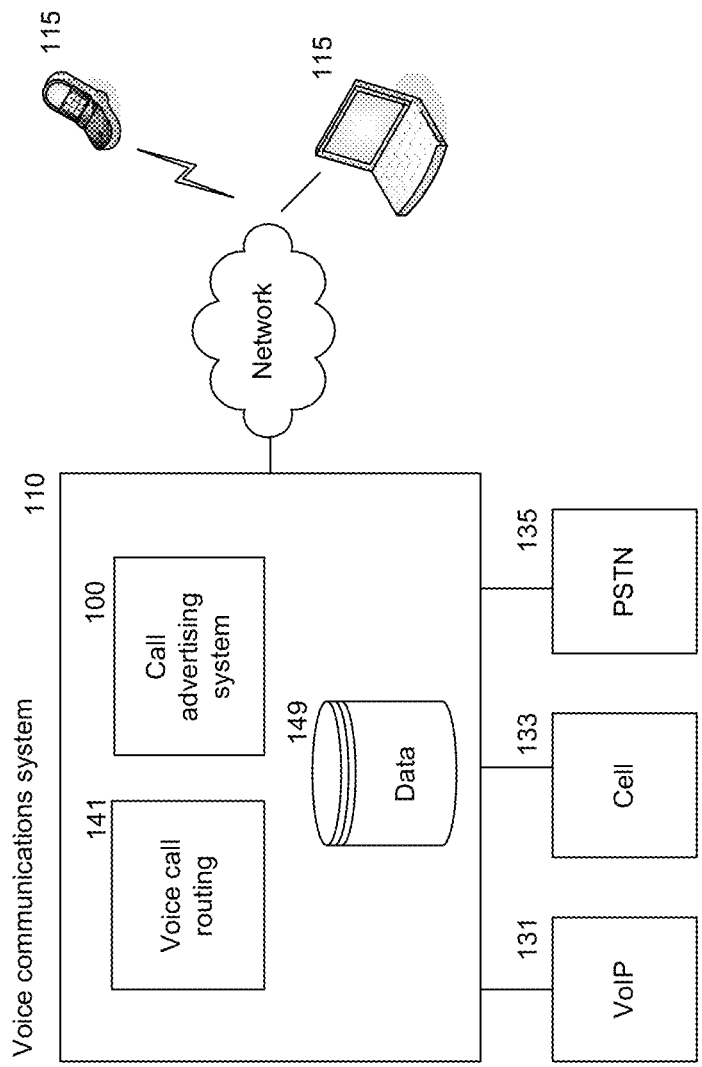
FIG. 1C is a block diagram illustrating components used in providing call advertising in a voice communication system.

FIGS. 1A and 1B depict the call advertising system 100 as being separate from the voice communications system 110. In some cases, the call advertising system 100 may be part of or integrated within the voice communications system 110, enabling the voice communications system to directly implement advertising of telephone numbers displayed on web pages and called by users of the voice communications system. FIG. 1C is a block diagram of a configuration in which the call advertising system 100 is incorporated within the voice communications system. When incorporated within the voice communications system 110, there is no need for a telephone number tracking component 145 since such functionality is contained within the call advertising system. Moreover, call routing may be simplified since only a single call routing needs to be performed.

Figure 1D:
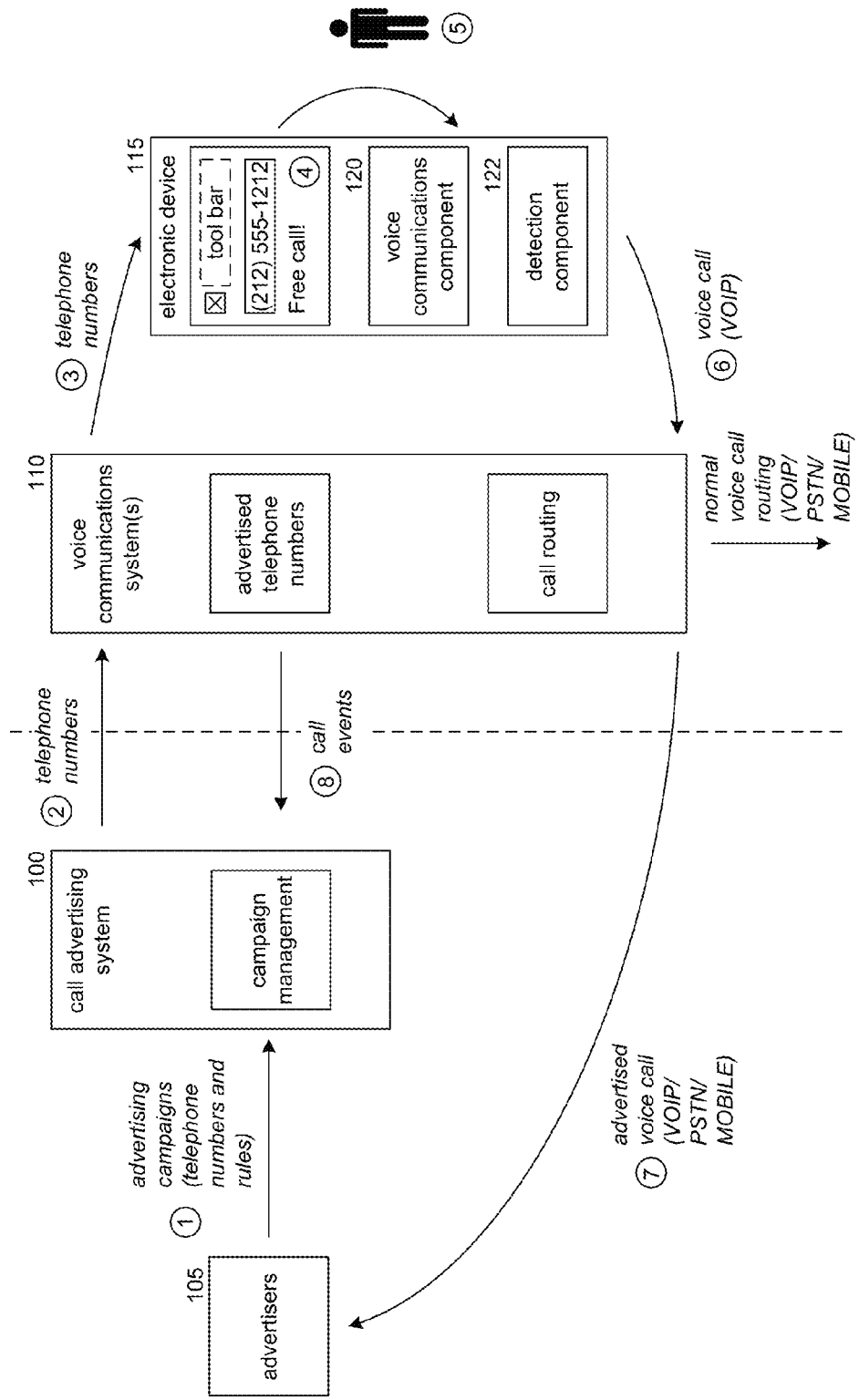
FIGS. 1D-1F are block diagram illustrating other environments in which a call advertising system can operate.

FIG. 1D is a block diagram illustrating an environment in which a call advertising system 100 operates in some embodiments. The environment is substantially the same as that of FIG. 1A, except that instead of routing calls to the call advertising system 100, the voice communications system 110 routes calls directly to advertisers 105. For calls routed to advertised telephone numbers, the voice communications system 110 also sends call event records to the call advertising system 100 so that the call advertising system 100 can maintain a record of the voice calls to advertisers. Call event records may be sent at the completion of each call so that each event record can contain a record of the call characteristics.

Figure 1E:
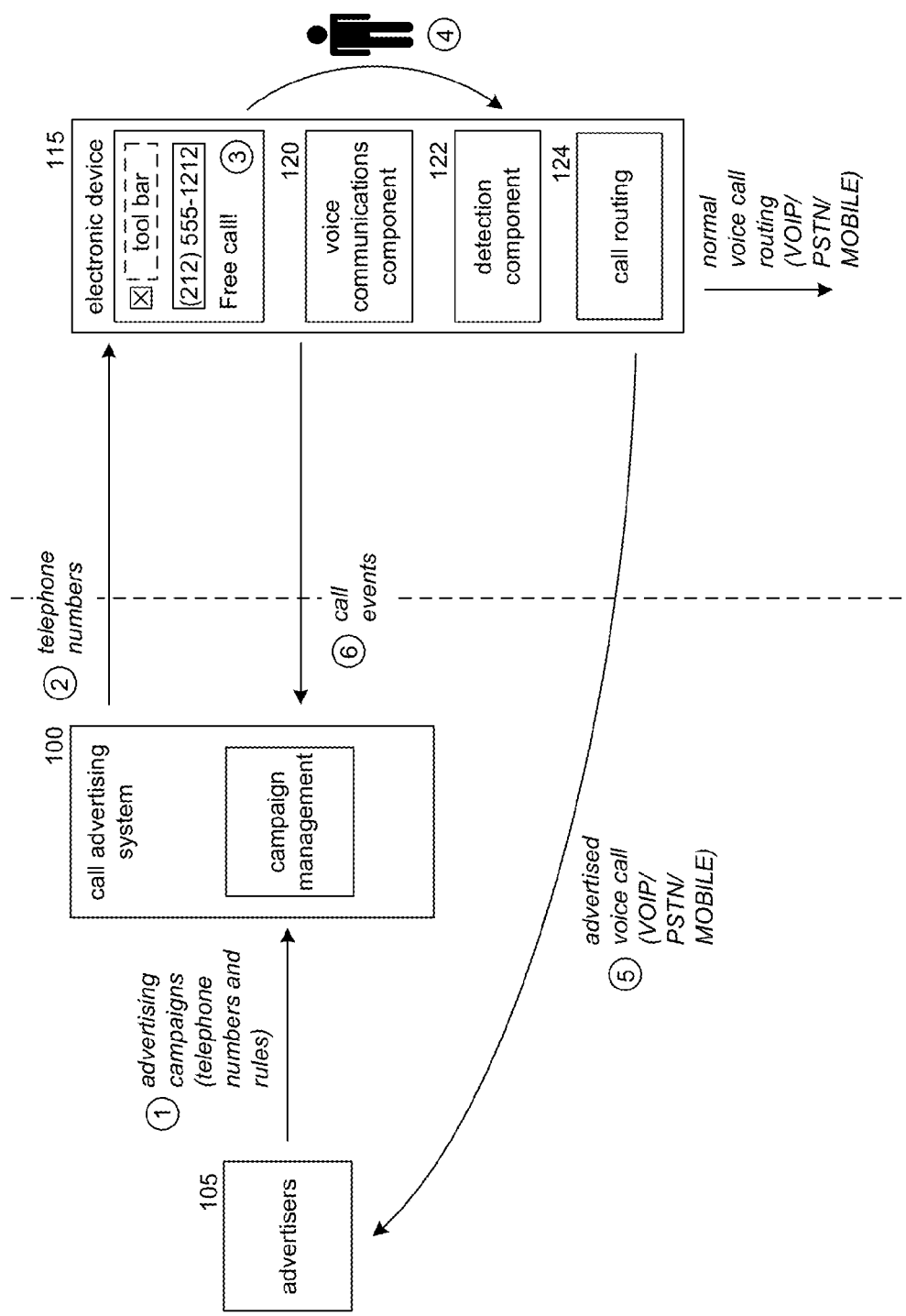

FIG. 1E is a block diagram illustrating an environment in which a call advertising system 100 operates in some embodiments. In the depicted environment, the call advertising system 100 interacts directly with the electronic device 115 without the voice communications system 110. When the electronic device 115 initiates a voice call to an advertiser telephone number, the electronic device 115 routes the voice call directly to the advertiser 105. The electronic device also sends call event records to the call advertising system 100 so that the call advertising system 100 can track voice calls to advertisers. Call event records may be sent at the completion of each call so that each event record can contain a record of the call characteristics.

Figure 1F:
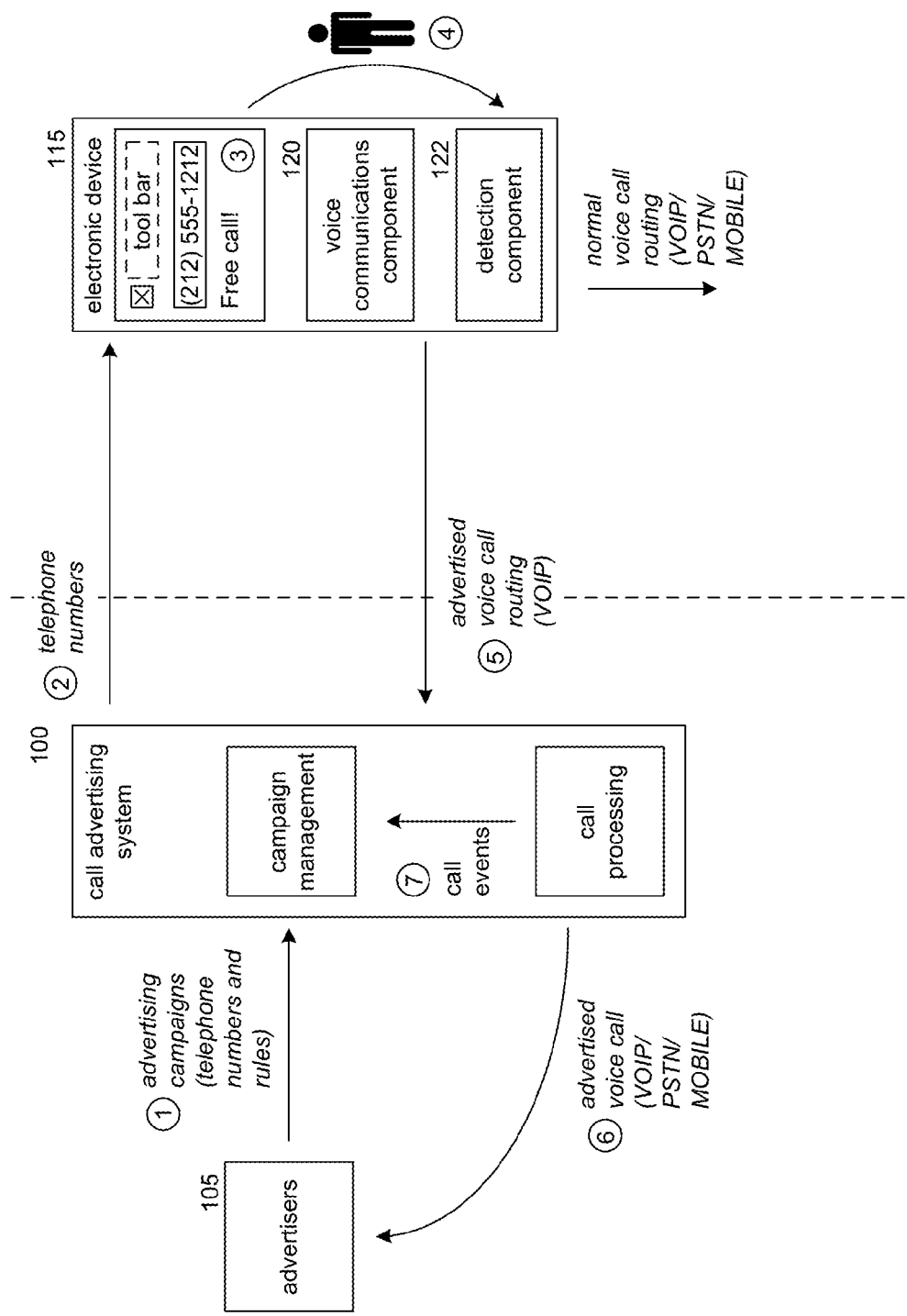

FIG. 1F is a block diagram illustrating an environment in which a call advertising system 100 operates in some embodiments. The environment is substantially the same as that of FIG. 1E, except that instead of the electronic device 115 routing a voice call directly to the advertiser 105, the electronic device 115 transmits the voice call to the call advertising system 100, which then routes the voice call to the advertiser 105.

The systems and components described in FIGS. 1A-1E and elsewhere herein may comprise software, firmware, hardware, or any combination(s) of software, firmware, or hardware suitable for the purposes described herein. Software and other components may reside on servers, workstations, personal computers, and other devices suitable for the purposes described herein. In other words, the software and other components described herein may be executed by a general-purpose computer, e.g., a server computer. Furthermore, aspects of the system can be embodied in a special purpose computer or data processor that is specifically programmed, configured, or constructed to perform one or more of the computer-executable instructions explained in detail herein. The system can also be practiced in distributed computing environments where tasks or components are performed by remote processing devices, which are linked through a communications network, such as a Local Area Network (LAN), Wide Area Network (WAN), or the Internet. In a distributed computing environment, program components may be located in both local and remote memory storage devices.

Data structures described herein may comprise computer files, variables, programming arrays, programming structures, or any electronic information storage schemes or methods, or any combinations thereof, suitable for the purposes described herein. Data and software may be stored or distributed on computer-readable media, such as computer-readable storage media and/or tangible media, including magnetically or optically readable computer discs, hard-wired or preprogrammed chips (e.g., EEPROM semiconductor chips), or other data storage media. Indeed, computer implemented instructions, data structures, screen displays, and other data under aspects of the system may be distributed over the Internet or over other networks (including wireless networks), or they may be provided on any analog or digital network (packet switched, circuit switched, or other scheme).

Advertising Displayed Telephone Numbers

Figure 2A:
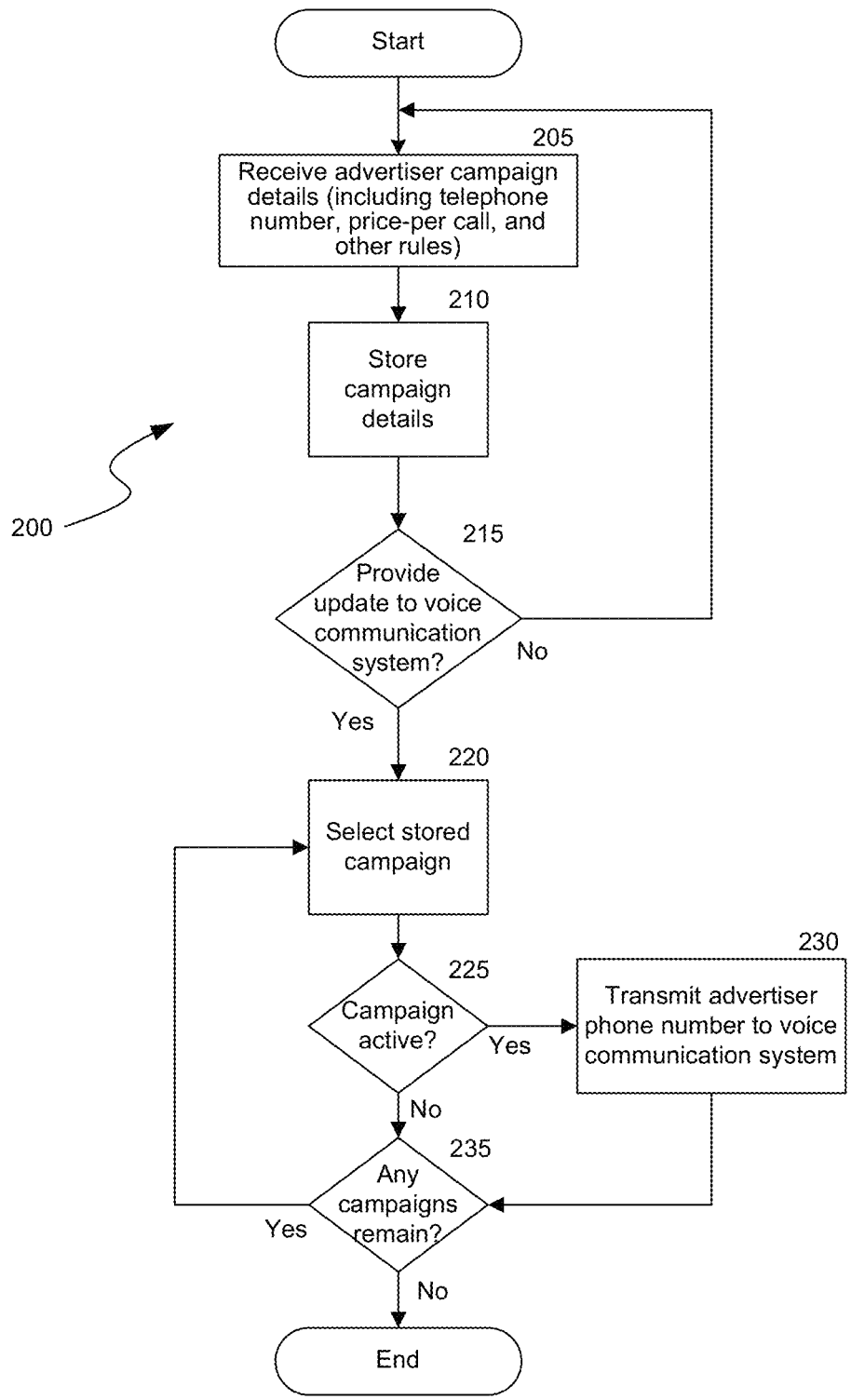
FIG. 2A is a flow diagram illustrating a routine for providing advertiser telephone numbers to a voice communications system.

FIG. 2A is a flow diagram illustrating a routine 200 for providing advertiser telephone numbers to a voice communications system. The routine 200 beings at step 205, where the call advertising system 100 receives details about an advertising campaign from an advertiser, including one or more telephone numbers, a price the advertiser is willing to pay per call made to the telephone number or numbers, and any rules associated with the campaign (e.g., a total budget for the campaign, range of times when the campaign should be active, etc.). The call advertising system 100 may receive the campaign details by providing a web portal in which advertisers may input a telephone number and optionally, information associated with the advertisement of the telephone number, such as parameters, criteria, guidelines, rules, or other information that define the display terms, billing information, user profile information, and so on. For example, the call advertising system 100 may receive information that includes an identification of a telephone number (e.g., 206-555-1111), a price the advertiser is willing to pay for each call received at that number (e.g., $1.75), and a maximum budget (e.g., $10,000) that the advertiser is willing to spend on calls to the telephone number over a certain period (e.g., 10 weekdays).

FIG. 2B illustrates an interface 250 that an advertiser can use to provide details about an advertising campaign, such as in step 205 of FIG. 2A. The interface 250 includes various fields that the advertiser can use to specify details about the advertising campaign. The advertiser can specify a client (if setting up the advertising campaign on behalf of a client), and a name of the advertising campaign in fields 252 and 254, respectively. The advertiser can also whether the advertiser is to be billed for calls directed to voice mail using in field 256.

The advertiser can also specify a start date of the advertising campaign in field 260 and an end date of the advertising campaign in field 262. The advertiser can specify a period of time (e.g., 30 minutes, 1 hour) in repeat caller window field 258. If the same person makes two or more voice calls to the same advertiser telephone number in the period of time, then the call advertising system 100 may elect not to charge the cost of one or more of the voice calls to the advertiser. The advertiser can also specify a minimum call duration in field 276. A voice call must exceed the specified minimum call duration in order for the call advertising system 100 to charge the cost of the voice call to the advertiser.

The interface 250 allows the advertiser to specify a budget for expenditures on voice calls using start date field 266, end date field 268, frequency field 270, budget amount field 272, IO/PO field 274, and price per voice call in field 278. For example, the advertiser can specify that an advertising campaign is to start on the 1st of the month, conclude by the 15th of the month, cost $1 per voice call, and that the maximum amount chargeable to the advertiser is $1,000. The call advertising system 100 would end the advertising campaign when $1,000 valid voice calls have been made or when the 15th of the month is reached, whichever comes first.

The information specified by the advertiser using interface 250 can be used to form rules that voice calls must satisfy in order for the advertiser to be obligated to pay for the voice calls. The advertiser can specify the information for each individual telephone number, or for sets of telephone numbers. The advertiser can provide telephone numbers to the call advertising system 100 using another interface, and the call advertising system 100 may ensure that telephone numbers are properly formatted and/or perform other validation tests on the telephone numbers before they can be used in an advertising campaign.

Returning to FIG. 2A, in step 210, the call advertising system 100 stores the campaign details. At a decision step 215, the call advertising system 100 determines whether an update of active campaigns should be made to the voice communication system 110. In some embodiments, the call advertising system provides a periodic batch update to the voice communications system of the active campaigns. For example, the call advertising system may only provide a daily update to the voice communications system of all telephone numbers that are intended to be advertised during the next 24 hours. In some embodiments, the call advertising system provides a continuous update to the voice communications system of the active telephone numbers. That is, once a campaign is activated (some campaigns may specify a "go active" date in the future), the call advertising system provides an update to the voice communications system of the active telephone number. If it is time to provide an update to the voice communications system at decision step 215, processing continues to step 220. Otherwise, processing returns to step 205 where the call advertising system waits to receive details of another campaign from an advertiser.

At step 220, the call advertising system 100 selects one of the stored campaigns that has not yet been reported to the voice communications system. At decision step 225, the call advertising system determines whether the campaign is currently active. It will be appreciated that an advertiser may bound a campaign by time (e.g., only active during the hours of 1 pm to 4 pm), dates (e.g., only active on the weekdays, only active during the month of July), or some other metric which results in the campaign having a start time and an end time. As a result, any particular campaign may or may not be active at a given point of time. If a campaign is active when checked by the call advertising system at decision step 225, processing continues to step 230. At step 230, the call advertising system transmits the phone number of phone numbers associated with the campaign to the voice communications system. Processing then continues to decision step 235. If, however, the campaign is not currently active at decision step 225, processing continues to decision step 235.

At decision step 235, the call advertising system determines whether any advertising campaigns remain to be analyzed. If campaigns remain to be analyzed, processing returns to step 220 where the system selects the next stored campaign for analysis. If, however, no campaigns remain to be processed at decision step 235, processing halts. After transmitting phone numbers to the voice communications system, the call advertising system continues to receive and store additional advertising campaigns until the next update to the voice communication system.

In some embodiments, in addition to transmitting the telephone numbers to the voice communications system 110, the call advertising system 100 transmits some or all of the campaign rules received in step 205, or may transmit a modified version of such information, to the voice communications system 110. Following the above example, the call advertising system may transmit the telephone number (206-555-1111), an indication that the telephone number is only being advertised Monday to Friday for the next two weeks, and an approximate number of calls (5714) that the voice communications system should allow to the number before exhausting the budget ($10,000, with each call costing $1.75) that is associated with the number. The following Table 1 is a representative data structure transmitted by the call advertising system 100 to the voice communication system 110:

TABLE 1

| Phone Number | # of calls | Time period |
|---|---|---|
| 206-555-1111 | 5,714 or less | 06.14.10 00:00-06.18.10 23.59 or 06.21.10 00:00-06.25.10 23.59 |

In circumstances in which the voice communication system 110 receives some or all of the campaign parameters, the voice communication system can regulate the advertisement of the campaign telephone numbers and the calls routed to the numbers to ensure that the campaign parameters are being adhered to.

After the call advertising system 100 has provided the advertiser telephone numbers to the voice communications system 110, the voice communications system interacts with the voice communication component 120 and detection component 122 on electronic devices 115 so as to enable the detection component to inform users of the electronic devices when free or lower cost voice calls can be made to the advertised telephone numbers.

Figure 3:
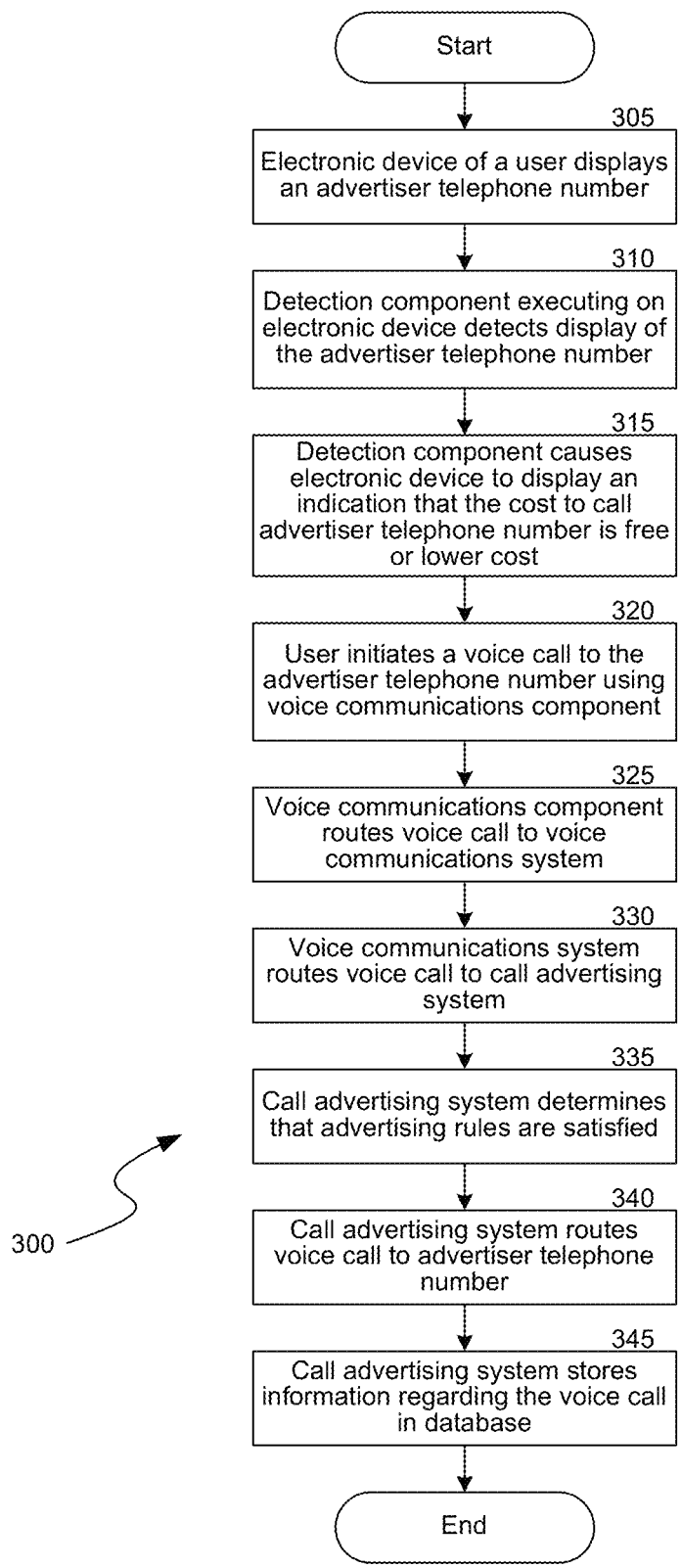
FIG. 3 is a flow diagram illustrating a routine for routing a voice call to an advertiser.

FIG. 3 is a flow diagram illustrating a process 300 for routing a voice call initiated on an electronic device to an advertiser telephone number. The process 300 begins at step 305, where a user's electronic device displays (or prepares to display) an advertiser telephone number. The user's electronic device includes a detection component 122 that executes on or is otherwise activated on the electronic device and is communicably coupled to the voice communications system 110. At step 310 the detection component 122 detects that the electronic device is displaying (or is preparing to display) an advertiser telephone number in electronic content. Examples of electronic content include web pages, documents, spreadsheets, emails, instant messages, and other items capable of including or displaying telephone numbers.

For example, the detection component 122 may analyze the electronic content to detect that the electronic device is displaying one or more advertiser telephone numbers. The detection component may parse the electronic content to detect telephone numbers. For example in the United States, phone numbers are typically in the format of XXX-YYY-ZZZZ, where XXX corresponds to an area code having a recognized range of values. In other countries, numbers will be searched for in the format used by local telephone numbers. When the detection component 122 detects a telephone number, the detection component can access a look-up table stored on the electronic device to determine whether the phone number is currently part of an advertising campaign (i.e., if a list of all telephone numbers currently in an advertising campaign are stored on the device). Alternatively or additionally, if a list of advertised phone numbers is not stored on the electronic device, or if only a partial list is stored on the electronic device, the detection component 122 may transmit the detected telephone number to the voice communications system 110. The voice communications system 110 can perform a look-up operation in the data storage area 149 to determine whether the telephone number is part of a current advertising campaign. The voice communications system 110 then transmits an indication of whether the telephone number is an advertiser telephone number to the detection component. If the telephone number is an advertiser telephone number, the detection component 122 can cause the electronic device to highlight the number, such as with an icon, in a different color, etc. The highlighted display of the telephone number is a cue to a user that a cost to call the advertiser telephone number is lower than it otherwise would be. For example, the phone call may be free to the user.

At step 315, the detection component 122 causes the electronic device to highlight the telephone number, thereby providing an indication that the cost to call the advertiser telephone number is lower than it otherwise would be. For example, the voice call may be free or may be charged at a lower cost to the user. The advertiser telephone number may be highlighted using any technique or combination of techniques described herein. In some cases, in addition to highlighting the advertiser telephone number, the detection component 122 also introduces a JavaScript object or other executable code that, upon selection of the advertiser telephone number by a user, causes the voice communication component 120 to initiate a voice call to the telephone number.

Figure 4A:
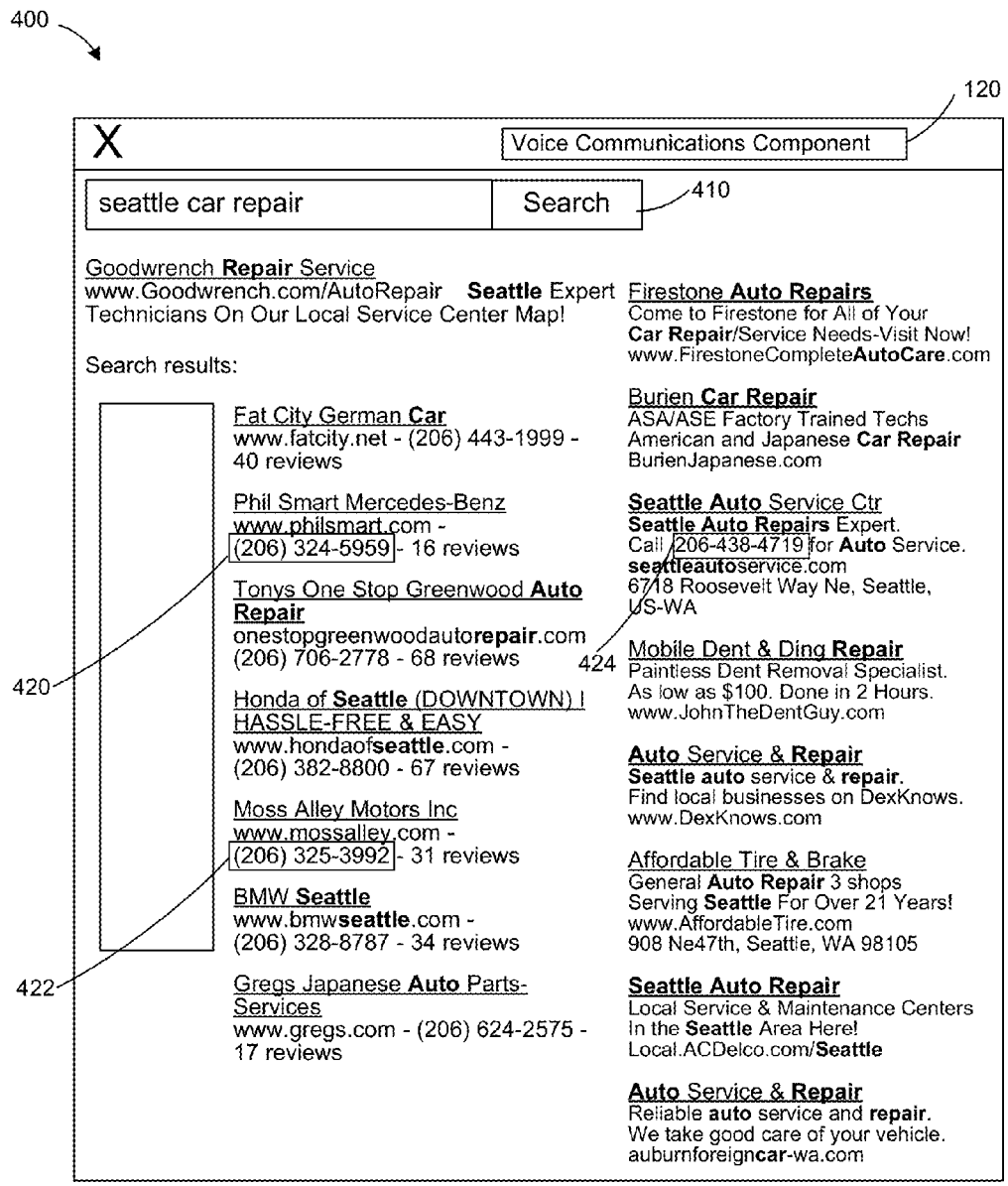
FIGS. 4A-4E are examples of interfaces displaying indications that advertiser telephone numbers are free or lower cost to call.

FIG. 4A illustrates a web page 400 that depicts how a detection component might display such highlighting to a user. The web page displays search results that were generated in response to a search query 410 for "Seattle car repair." The web page 400 shows many results from the search, including three results that include advertiser telephone numbers. For example, the search results include a result for "Phil Smart Mercedes-Benz" that includes an advertiser telephone number and highlighting 420 that a free or lower cost voice call to the advertiser telephone number can be made. The search results also include a result for "Moss Alley Motors" that includes an advertiser telephone number and similar highlighting 422, and a result for Seattle Auto Service Center with similar highlighting 424. In accordance with the system and method described herein, a user wishing to call one of the highlighted numbers can simply click on the advertiser telephone number or highlighting, initiating a free or reduced-price call from the user to the advertiser telephone number via the voice communication component 120 of the user's electronic device. In contrast, if the user selects one of the non-highlighted telephone numbers, the voice communications component 120 will still complete the call but the user will be charged the regular price for such call.

Returning to FIG. 3, at step 320 the user initiates a voice call to the advertiser telephone number via the voice communication component 120 on the user's electronic device. The user may initiate a voice call by selecting the telephone number or associated indicia using an input device of the electronic device (e.g., a mouse, a keyboard, a touch screen display, a voice recognition component, etc.). At step 325, the voice communications component 120 routes the voice call to the voice communications system 110 over the network 147.

If the voice communications component 120 uses VoIP, the voice communications component can digitize and packetize the voice call for VoIP transmission. The voice communications component 120 can also append information related to or associated with the voice call in any set-up communications that initiate a call or as part of a subsequent voice communications session. Such appended information can include a context in which the telephone number was presented, such as information identifying a web page presenting the telephone number, information identifying content of the web page, information identifying the user, information identifying a location of the user, information identifying a previous calling history associated with the user, and other information. The voice communications component 120 generates IP packets that include fields storing the information, and transmits the generated packets to the voice communications system. An example of a generated packet is contained in the following Table 2:

TABLE 2

| Call ID | User ID | Called Phone Number | Caller Phone Number | Web page ID | Web page CXT | User Location |
| --- | --- | --- | --- | --- | --- | --- |

In the generated IP packet depicted in Table 2, the packet includes information identifying the voice call (such that the voice call may be uniquely identified amongst multiple voice calls), information identifying the user (e.g., a user identifier provided by the voice communications system 110), information identifying the telephone number that the user has called, information identifying the caller phone number, information identifying the web page (e.g., the URL, the name of the website, and so on), information providing context about the web page (e.g., the type of page, information characterizing the content within the page, and other information), and information identifying the user's location (e.g., the geographical location, the location where the user has access to the network, and so on).

In step 330, the voice communications system 110 determines that the voice call is to an advertiser telephone number and routes the voice call to the call advertising system 100. In contrast, if the voice call was not to an advertiser telephone number, the voice communications system 110 may route the voice call directly to the entity associated with the telephone number (bypassing the call advertising system 100). The voice communications system 110 may determine that the voice call is to an advertiser telephone number by comparing the destination phone number with a list of advertiser numbers that are currently part of an active advertising campaign. Alternatively, the electronic device may previously have determined that the voice call is the an advertiser telephone number and therefore have coded the voice call in a manner that indicates to the voice communications system that the call should be routed to the call advertising system 100.

In step 335, the call advertising system 100 can determine that the voice call satisfies one or more campaign rules as a precursor to routing the voice call to the advertiser. For example, the call advertising system 100 can determine that an absolute number of voice calls to the advertiser telephone number does not exceed a predetermined maximum number, that a number of voice calls to the advertiser telephone number within a certain period of time does not exceed a predetermined maximum number, or that the voice call is made during an acceptable time range. If the call advertising system 100 determines that the voice call does not satisfy a campaign rule, the call advertising system can decline to route the call to the advertiser. Alternatively, the call advertising system 100 can still route the call but note that a campaign rule is not satisfied for later reconciliation with the advertiser and/or the voice communication system 110. In some embodiments, the voice communications system 110 does not determine whether the voice call satisfies any campaign rules.

In step 340, the call advertising system 100 routes the voice call to the advertiser telephone number. The call advertising system can route the voice call over a VoIP network, a PSTN network, a cellular network, or by using any suitable means of routing the call to the advertiser. In some embodiments, the advertiser telephone number is a call tracking number, and the call advertising system 100 accesses a data structure (e.g., in database 137) to determine an actual telephone number to which to route the voice call. That is, the telephone number that was displayed to a user is mapped to a different telephone number or other destination by the user of a data structure that stored such mapping information.

In step 345, the call advertising system 100 stores information regarding the voice call in the database 137. The process of storing information can include debiting, decrementing, or otherwise updating an account of the advertiser to reflect the routing of a placed call to the advertiser telephone number. Following the above example, the call advertising system 100 may track the number of calls placed to the telephone number 206-555-1111, decrementing the total number of eligible calls until zero calls are reached. Of course, the call advertising system 100 may track the number of calls in other ways.

In some embodiments, in addition to or instead of obtaining information about voice calls from generated packets, the call advertising system 110 receives a call detail record (CDR) from the voice communications system 100 after each voice call. The call detail record may contain the same information as in the generated packets, as well as additional information.

The call advertising system 100 enables users to place free or low cost voice calls to telephone numbers that would otherwise be charged at a higher cost to the users. The call advertising system thus subsidizes the cost of making the voice call for the users. The existence of such subsidies may be publicized to users, or may be kept hidden from the users. When published, however, the subsidizing of voice calls to advertiser telephone numbers serves to motivate users to place voice calls to the advertiser telephone numbers. Among other benefits, advertisers benefit by increased voice traffic and a greater likelihood of making a sale to a caller.

In some embodiments, the call advertising system 100 also enables advertisers and other entities associated with a telephone number to receive calls targeted to specific services or areas within the entities. For example, the call advertising system 100 can information about the context in which a telephone number was presented to a user as a basis for routing a voice call. For example, the call advertising system 100 may extract the context information associated with a voice call, and use such context information to identify an extension within the telephone number in which to direct the call. The call advertising system can also use the extracted context information to provide information to a recipient associated with the telephone number and for other purposes. As an example of using context information to route a call, a user may direct her browser to a search engine and perform a search for "new brake pads Austin." The search engine returns many results, including a result for the "Austin Automotive Center" that includes an advertiser telephone number. The user selects the advertiser telephone number, which is the general telephone number for the advertiser, to initiate a call between the user and the Austin Automotive Center using the voice communication component of the electronic device (e.g., Skype on the user's computer, mobile device, or other electronic device). The voice communication component 120 initiates the voice call and routes the voice call to the voice communication system 110, which in turn routes the voice call to the call advertising system 100. Upon receipt, the call advertising system 100 reviews the received voice call, and extracts context information which indicates that the user searched for "new brake pads" before initiating the call. The call advertising system 100, having knowledge of the user's search terms, routes the voice call to an extension of the general telephone number that is associated with the Austin Automotive Center's service department. Thus, the call advertising system 100 can intelligently identify and determine how to route voice calls made to telephone numbers.

In response to a selection of a telephone number by a user, the voice communications component 120 may initiate a voice call to the telephone number, as described herein, and the voice call and any appended information are transmitted concurrently to the call advertising system 100 (e.g., over the same VoIP channel). However, in some cases, the voice communications component 120 may utilize separate channels for the voice call and for information associated with the voice call. For example, when the voice communications component is on a mobile device that uses a cellular or other proprietary wireless network for voice calls, the voice communications component may route the voice call over the proprietary wireless network and concurrently send information associated with the voice call using a separate channel (e.g., an SMS channel) to the call advertising system 100. In such a situation, the mobile device can use its standard calling functionality for voice calls and use another communication channel to communicate with the call advertising system 100. In these cases, the advertiser subsidizing the telephone number may provide terms that dictate subsidizing charges within traditional calling plans. For example, the advertiser subsidizing the telephone number may pay for the cost of the minutes used in a call placed to the telephone number via a cell network, among other things.

Figure 4B:
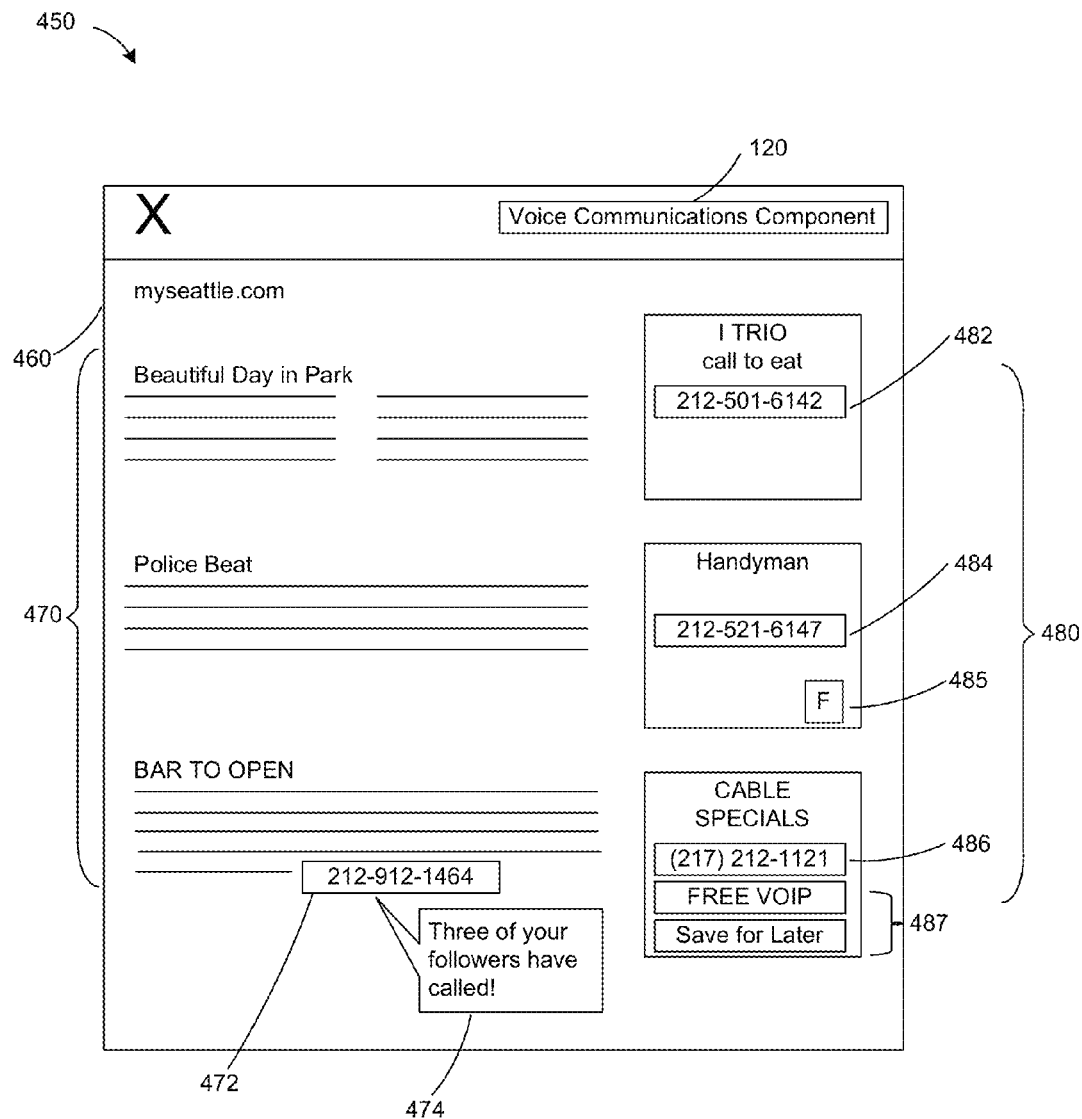
Figure 4C:
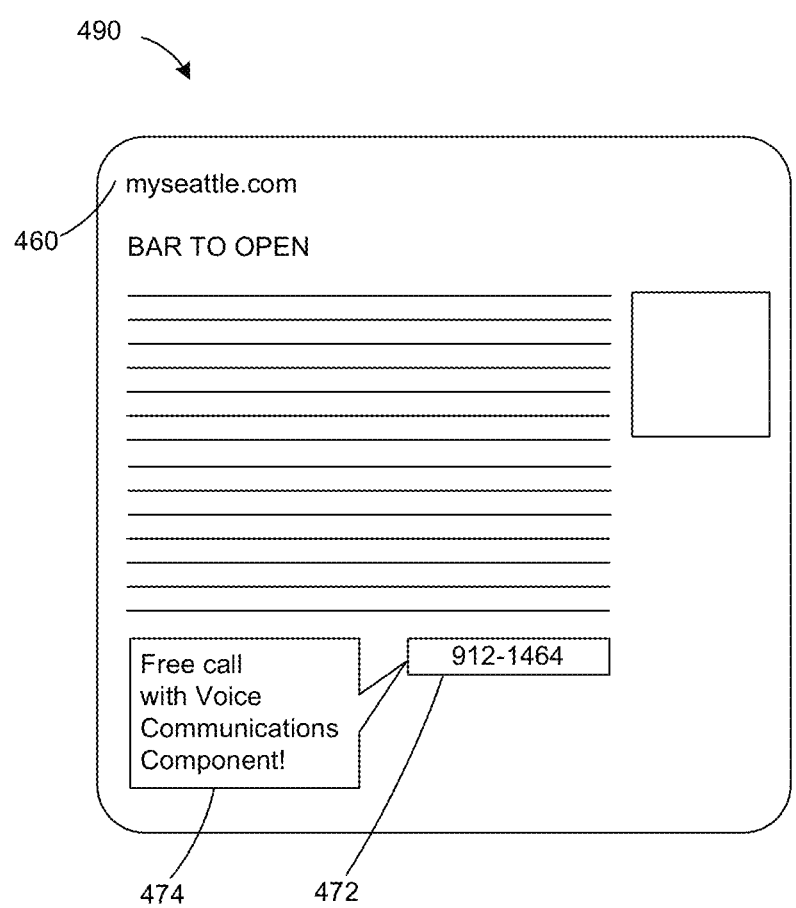

As described herein, the detection component 122 highlights when advertiser telephone numbers included in electronic content can be called at a free or lower cost. FIGS. 4B and 4C are examples of web pages displaying advertiser telephone numbers for which the cost to call is at least partially subsidized and different ways by which such indications can be displayed. The web page may highlight that a telephone number is lower cost to call using boxes, different backgrounds, different fonts, animations, or other graphical elements that distinguish a subsidized telephone number from other numbers on a web page. The detection component 122 may also highlight an advertiser's telephone number using information extracted from a user's social network, such as information from Twitter followers, Facebook friends, and so on.

FIG. 4B depicts a web page 450 that includes a VoIP service plug-in 455 and displays a web page named "myseattle.com" 460. The web page 450 includes various blog entries 470 and advertisements 480, some of which display telephone numbers in accordance with systems and methods described herein. For example, the blog entry entitled "Bar to Open" includes a telephone number that is highlighted by a box 472 and is further highlighted by a text balloon 474. The text balloon contains information drawn from the user's social network, namely that "three of [the user's] followers have called" the indicated number in the text balloon. The use of social network information provides an added incentive for a user to call the highlighted number, as consumers will typically follow recommendations of friends or families in the absence of a more definitive recommendation.

Various advertisements 480 also display telephone numbers that are part of an advertising campaign in accordance with systems and methods described herein. For example, the advertisement for "Trio" includes a telephone number and an highlighting 482 indicating that the telephone number is part of a campaign. The advertisement for "Handyman" includes a telephone number, highlighting 484 indicating that the telephone number is part of a campaign, and a graphical element 485 that indicates one or more of a user's Facebook friends has provided information about the advertised service. The advertisement for "Cable Specials" includes a telephone number, highlighting 486 indicating that the telephone number is part of a campaign, and a menu 487 of options associated with placing a call to the campaign telephone number, including an option to place a free call to the telephone number ("FREE VoIP") and an option to save the telephone number in the user's list of contacts ("Save for Later").

Other examples of highlighting not shown herein, including other graphics, display elements, animations, JavaScript elements, pictures, images, text, and so on. For example, the electronic device may display the following along with a campaign telephone number:

A link to another web page;
An interactive component;
An advertisement;
An image of a Facebook friend that has placed a call to an advertiser telephone number;
A graphic that indicates the advertiser telephone number is free to call for only a limited time;
Text that indicates how many users have called an advertiser phone number;
Text that displays testimonials associated with the advertiser telephone number; and
A graphic that indicates the advertiser telephone number can be saved in a user's list of contacts.

In addition to electronic content displayed by desktop or laptop computers, a detection component 122 may execute on a mobile phone and cause advertiser telephone numbers to be indicated as free or lower cost in web pages displayed by the mobile phone. FIG. 4C is a web page 490 displayed by a mobile phone that displays a portion of the myseattle.com web page 460 of FIG. 4B. As discussed with respect to FIG. 4B, the web page 460 includes a blog entry entitled "Bar to Open" that has a telephone number along with highlighting 472 and 474 that indicates the telephone number is part of an advertising campaign. A user of the mobile phone may select the telephone number, initiating a call to the telephone number using a voice communications system 110 installed on the mobile phone, such as Yeigo, Fring, Truphone, Vopium, Pocket8, Skype, and many others.

Figure 4D:
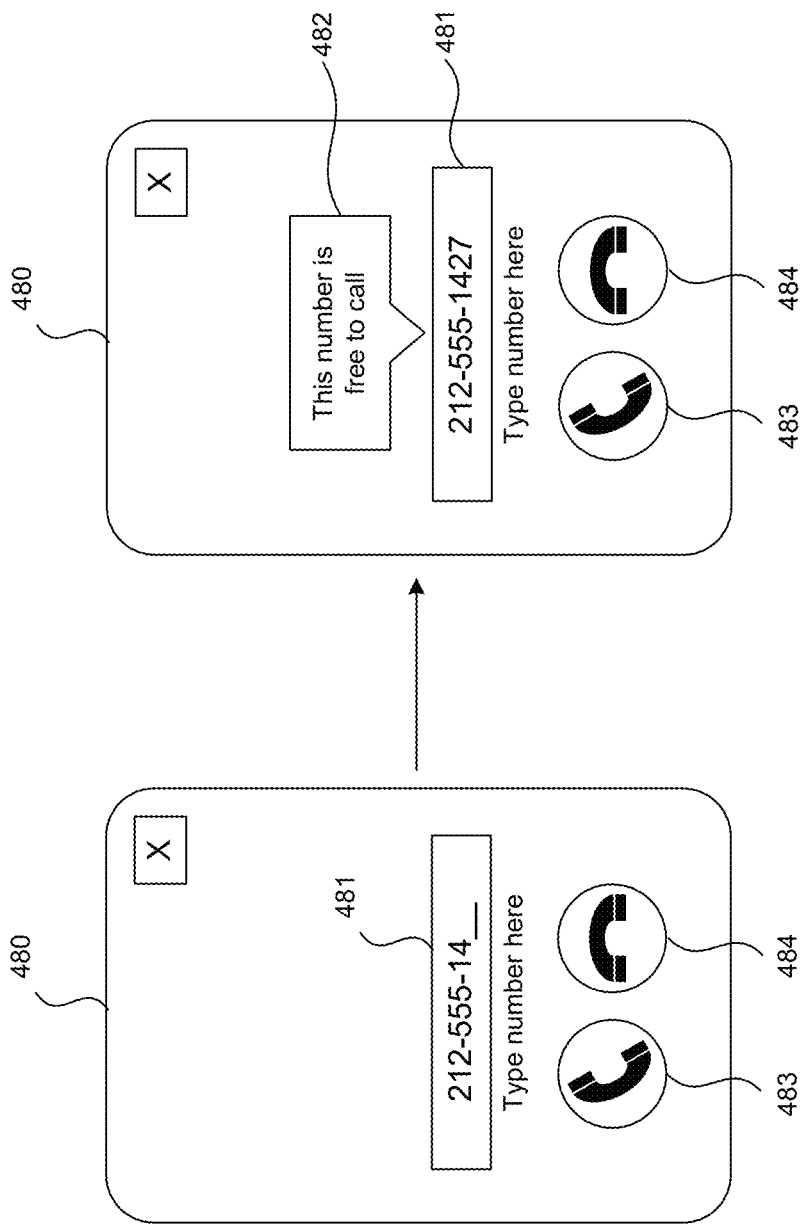

FIG. 4D is a diagram illustrating an interface 480 that can be provided by the voice communications component 120 (or other suitable software component) for initiating voice calls. The interface 480 includes an input region 481 in which a user can input a telephone number and buttons 483 and 484 that allow the user to initiate and terminate a voice call, respectively. While the user is inputting or after having inputted a telephone number in region 481, the voice communications component 120 can determine that the telephone number is associated with an advertising campaign. The voice communications component 120 can then display an indication 482 that the telephone number is free or a lower cost to call. Alternatively or additionally, the voice communications component 120 can highlight the telephone number to indicate that the telephone number is free or a lower cost to call. The voice communications component 120 can provide the indication 482 or the highlighting prior to or after the initiation of the voice call by the user. FIG. 4D thus illustrates that a user can input a telephone number and then be notified that a voice call to the telephone number is free or lower cost.

Figure 4E:
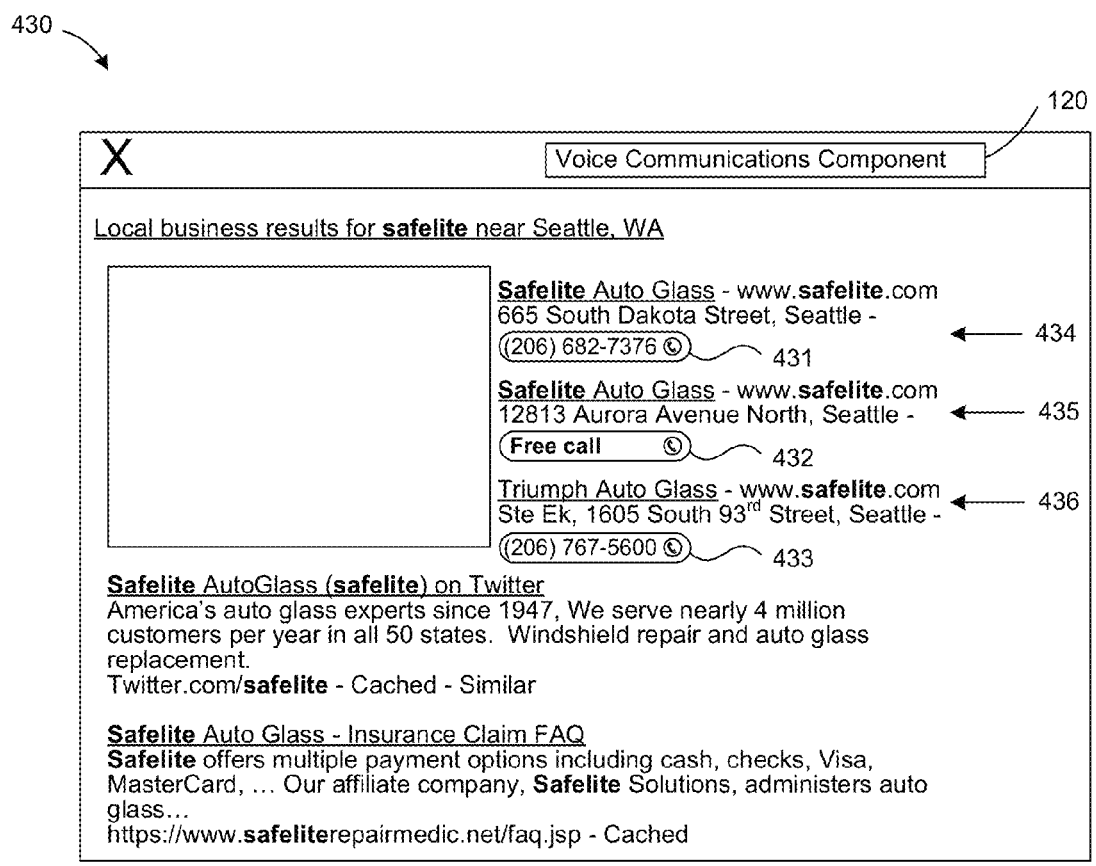

FIG. 4E is an example of a web page displaying search results (which can be paid search results, unpaid search results, or a combination of paid and unpaid search results) that include telephone numbers. Search results 434 and 436 include telephone numbers that are not part of any advertising campaign. The voice communications component 120 has detected the telephone numbers and determined that they are not part of any advertising campaign. Accordingly, the voice communications component 120 overlays the telephone numbers with ovals 431 and 433 containing the telephone numbers 431 and an icon indicating that a user can make a call to the telephone numbers 431 using the voice communications component 120.

Search result 435, however, includes a telephone number that the voice communications component 120 has detected and has determined is part of an advertising campaign. Accordingly, the voice communications component 120 overlays the telephone number with an oval 432 containing an indication that the user can make a free call to the telephone number using the voice communications component 120. Although the oval 432 hides display of the telephone number, the user may be able to cause the voice communications component 120 to display the telephone number (e.g., using a drop down menu item). Accordingly, FIG. 4E illustrates how the voice communications component 120 can detect a telephone number, determine whether the telephone number is associated with an advertising campaign, and if so, cause an indication that a user can make a free voice call to the campaign telephone number to be displayed.

Analytics/Reports

As discussed herein, in some examples, the call advertising system 100 correlates information associated with voice calls placed to advertiser telephone numbers (e.g., information such as user identification information or information about web pages displaying advertiser telephone numbers) with information received from advertisers (e.g., sales conversion information). Among other things, such correlation enables the call advertising system 100 to provide information indicating the effectiveness of advertising campaigns to advertisers. The call advertising system 100 can also provide other information about callers of advertiser telephone numbers to advertisers, such as demographic information, location information, information about sources of voice calls (e.g., from web pages or from software programs) and other information.

The call advertising system 100 tracks metrics associated with routed voice calls and generates statistical information that can be useful to advertisers who wish to make improvements in call handling, advertising campaigns, or other aspects of the advertiser's sales or marketing processes. The tracked metrics may include information such as sources of voice calls, length/duration of voice calls, and context information about voice calls. The call advertising system 100 correlates tracked metrics with conversion data provided by the advertiser in order to, among other things, allow the advertiser to ascertain or determine an overall performance of a particular advertising campaign.

Figure 5:
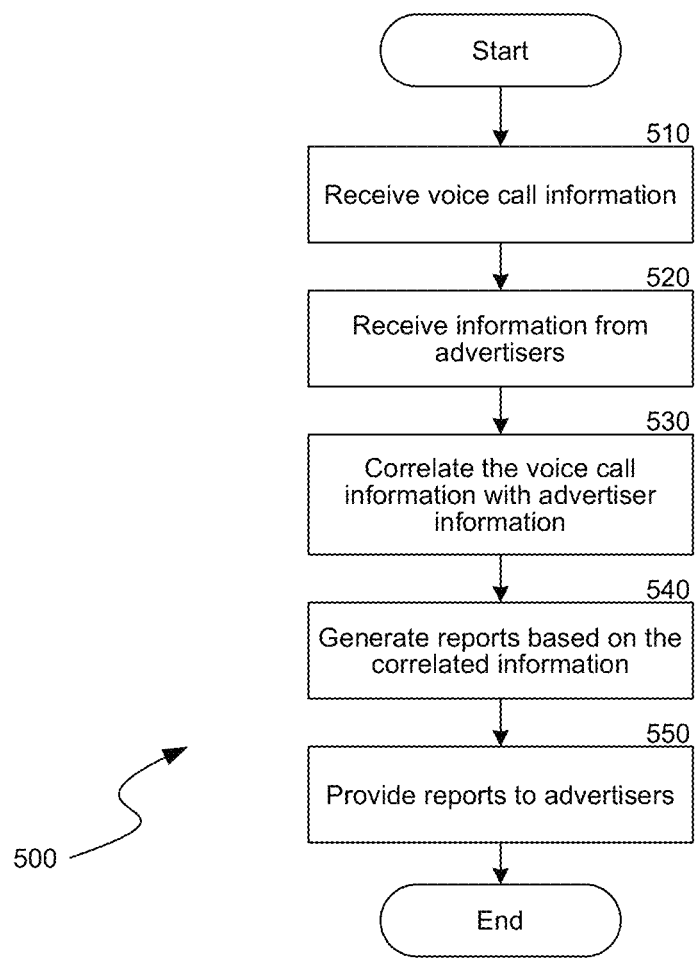
FIG. 5 is a flow diagram illustrating a routine for generating reports from voice call information and advertiser information.

FIG. 5 is a flow diagram illustrating a routine 500 for correlating information associated with voice calls placed to advertiser telephone numbers with information received from advertisers. In step 510, the call advertising system 100 receives information associated with voice calls. The call advertising system 100 may receive some or all of the voice call information discussed herein, including user demographic information, context information, location information, and so on. Such voice call information may be included in the voice calls routed to the call advertising system 100 by the voice communications system 110 (for example, in conjunction with VoIP packets carrying the voice calls). Additionally or alternatively, the call advertising system 100 may receive such call information from the voice communications system 110 separately from the voice calls. The call advertising system 100 may store the voice call information in a table or other data structure, as shown in Table 3, where each entry in the table or data structure is for a single voice call to an advertiser telephone number:

TABLE 3

Data structure of voice call information

Advertiser telephone number called
A user identifier (e.g., Skype User ID or phone number)
An electronic content identifier (e.g., web page URL, Microsoft Word document title, etc.) and/or other context information
Date/time of the voice call
Length/duration of the voice call
User information (e.g., the user's location, demographic, and other information about the user)
Information about the voice communication component (e.g., version information, information about the device on which the voice communication component executes, etc.)

In step 520, the call advertising system 100 receives information from advertisers associated with advertiser telephone numbers, such as information associated with a conversion rate of voice calls to an advertiser telephone number (e.g., the percentage of voice calls that ultimately resulted in sales, appointments, or other favorable action to the advertiser), information about user geographical locations, information about user demographics, and other information. The call advertising system 100 may store the advertiser information in a table or other data structure, as shown in Table 4, where each entry in the table or data structure is for a single voice call to an advertiser telephone number:

TABLE 4

Data structure of advertiser information

Advertiser telephone number called
Date/time of the voice call
Indication of whether the voice call resulted in a conversion, and optionally, goods or services purchased and/or sale amount
User information (e.g., the user's location, demographic, and other information about the user)

In step 530, the call advertising system 100 correlates voice call information with the advertiser information. The call advertising system 100 may use the advertiser telephone number, the date/time of the voice call, and/or user information to correlate the voice call information with the advertiser information.

In step 540, the call advertising system 100 generates reports based on the correlated information. The generated reports can be used by the advertisers to judge the effectiveness of advertising campaigns. For example, the call advertising system 100 can generate a report that shows conversion rates for different age demographics (e.g., a 25% conversion rate for the age group 18-29, a 35% conversion rate for the age group 30-45, a 15% conversion rate for the age group 46-65, etc.). As another example, the call advertising system 100 can generate a report that indicates total or relative numbers of calls to an advertiser telephone by demographic information such as age, gender, location or other information. As another example, the call advertising system 100 can generate a report that indicates a total or relative numbers of calls by voice communication component information (e.g., information about the device on which the voice communication component executes). Such a report may show, for example, that users of certain devices (e.g., mobile devices) are more likely to call advertiser telephone numbers than users of other devices (e.g., desktop computers).

As another example, the call advertising system 100 can provide the following types of information in the generated reports: 1) call activity information, which can include information on all voice calls to the advertiser; 2) information about customers who have called the advertiser; 3) information about sources of voice calls (e.g., different web pages, different search engines, different software programs, etc.); and 4) other information about voice calls (e.g., information about voice calls originating from unknown callers, etc.) The call advertising system 100 can provide such information for any set of telephone numbers associated with an advertiser, and also provide options for filtering, grouping or otherwise organizing information in the generated reports.

The call advertising system 100 can generate other reports, such as reports directed to the duration of voice calls placed to an advertiser telephone number, the time periods in which voice calls are made, and so on. In general, the call advertising system 100 can generate various reports based on information tracked by the call advertising system 100, based on information received from an advertiser associated with the advertiser telephone number, and/or based on information received from the voice communications system 110. Additionally, the call advertising system 100 can receive information from third-party entities that have user information (e.g., social networking sites that can provide user information) and use such information in generating reports. At step 550, the call advertising system 100 provides the generated reports to advertisers (e.g., by making the generated reports available on a secure web portal, by emailing the generated reports to the advertisers, or by other means). After step 550, the process 500 concludes.

The call advertising system 100 may perform other actions based on the generated reports, such as modifying and/or adjusting a current or future advertising campaign. The call advertising system 100, in response or based on information in the generated reports, may adjust an advertising campaign, such as during the advertising campaign, in order to enhance the effectiveness of the advertising campaign. Additionally or alternatively, the call advertising system 100 can provide interfaces (e.g., interfaces provided by the campaign component 127) to advertisers that allow the advertisers to modify parameters of current or future advertising campaigns.

Figure 6:
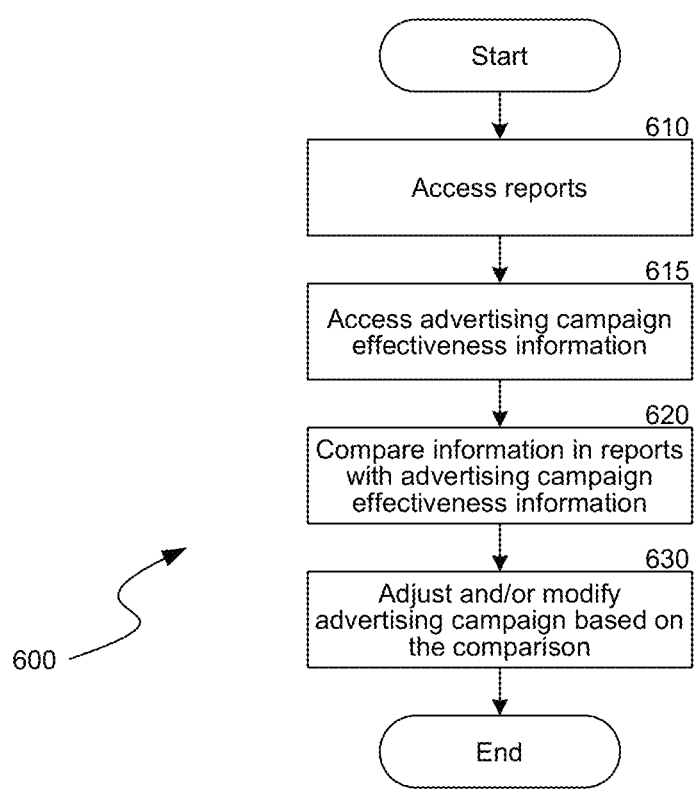
FIG. 6 is a flow diagram illustrating a routine for adjusting an advertising campaign.

FIG. 6 is a flow diagram illustrating a routine 600 for adjusting an advertising campaign. In step 610, the call advertising system 100 accesses reports generated by the process 500 of FIG. 5, and/or provides access to such reports to advertisers. In step 615, the call advertising system 100 accesses advertising campaign effectiveness information. Such information may include rules and/or threshold values associated with a determination of the effectiveness of an advertising campaign. An advertiser may provide certain rules or values that identify when an advertising campaign is or is not an effective campaign. These rules/values may specify that a certain number of voice calls should be placed to an advertiser telephone number in a certain time period, that a certain number of voice calls should be placed to an advertiser telephone number from a certain type of user (e.g., users between 18-34 years of age, users within the United States, and so on), and other criteria.

In step 620, the call advertising system 100 compares the report information with the advertising campaign effectiveness information. In step 630, the call advertising system 100 adjusts and/or modifies an advertising campaign based on the comparison. The call advertising system 100 may adjust various parameters of an advertising campaign, such as the time period in which to offer free voice calls, the number of free voice calls that can be placed during the advertising campaign, or other parameters provided by an advertiser when defining the advertising campaign. In addition to the call advertising system 100, the advertiser can also adjust various aspects of an advertising campaign. For example, the advertiser can use a comparison of report information with advertising campaign effectiveness information to change an advertising campaign to only provide free voice calls within search results pages. The advertiser may choose to do so because the generated report indicated a high conversion rate of voice calls placed to the advertiser that were initiated from search results pages.

As an example of the call advertising system 100 adjusting an advertising campaign, the call advertising system 100 can compare the first 500 calls placed to a telephone number associated with a community college. The call advertising system 100 accesses the following information (step 610): 200 of the 500 calls were placed between 9 AM and 12 PM, with an average duration of 6.5 minutes, and 300 of the 500 calls were placed after 12 PM, with an average duration of 1.5 minutes. The call advertising system 100 compares this information (step 620) to threshold values associated with advertising campaign effectiveness information (e.g., the average duration of all 500 calls should be greater than 4.0 minutes), and determines that the campaign has not reached the target effectiveness (the average duration of the first 500 calls is only 3.5 minutes). The call advertising system 100 adjusts the campaign (step 630) to only occur during the 9 AM to 12 PM time period, in order to raise the average duration of calls, and thereby attempt to achieve the threshold value of effectiveness for the advertising campaign.

As another example of the call advertising system 100 modifying an advertising campaign, the call advertising system 100 might receive and connect 1,000 voice calls placed to a telephone number that is part of an advertising campaign for a restaurant. As each voice call is routed, metric information associated with the voice call is stored and data reflecting the outcome of each voice call may be received from the restaurant and correlated with each voice call. The call advertising system 100 can identify that 90 percent of voice calls placed after 5 PM resulted in users making reservations to dine at the restaurant, while only 30 percent of calls placed before 5 PM resulted in made reservations. The call advertising system 100 can generate a report describing such findings and transmit the report to the restaurant. Using information from the report, the restaurant might define an advertising rule that the restaurant will only advertise for voice calls to the restaurant telephone number after 5 PM.

As another example of modifying an advertising campaign, the advertiser may determine from the generated reports that a majority of voice calls to the advertiser telephone number are originating from web pages, and that a majority of the web pages are web pages that provide search results. The advertiser may adjust parameters of the advertising campaign to narrow the contexts in which the advertiser is willing to pay for voice calls to the advertiser telephone number, such as only for voice calls originating from search results web pages. Accordingly, an electronic device 115 would only provide an indication that a voice call is lower cost for when the advertiser telephone number is included in a search result web page, and not when the advertiser telephone number is included in other web pages or when the user inputs (e.g., keys or types) the advertiser telephone number into the electronic device 115.

Conclusion

The above detailed description of examples of the technology is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

From the foregoing, it will be appreciated that specific embodiments of the system have been described herein for purposes of illustration, but that various modifications may be made without deviating from the spirit and scope of the system. Accordingly, the system is not limited except as by the appended claims.

I claim:

1. A method in a computing system for performing context-based call routing to advertisers, the method comprising:
   receiving a first advertiser phone number that is associated with an advertising campaign of an advertiser;
   providing the received first advertiser phone number to an electronic device of a user, wherein the electronic device displays the first advertiser phone number to the user and displays an indication that the user may initiate a voice call to the displayed first advertiser phone number;
   receiving, at the computing system, a request to initiate a voice call between the user and the first advertiser phone number;
   receiving, at the computing system, information indicative of the context in which the first advertiser phone number was displayed to the user;
   determining, by the computing system, based on at least the received request to initiate a voice call to the first advertiser phone number and the information indicative of the context in which the first advertiser phone number was displayed to the user, a second phone number of the advertiser; and
   redirecting, by the computing system, the received request from the first advertiser phone number to the determined second advertiser phone number by causing a voice call to be initiated for the user using the determined second advertiser phone number instead of the first advertiser phone number.

2. The method of claim 1, wherein the information indicative of context comprises information identifying the user who requested the voice call.

3. The method of claim 1, wherein the information indicative of context comprises an identity of a web page on which the first advertiser phone number was displayed when the first advertiser phone number was selected.

4. The method of claim 1, wherein the information indicative of context comprises content that was being viewed when the first advertiser phone number was selected.

5. The method of claim 1, wherein the information indicative of context comprises the circumstances under which the first advertiser phone number was displayed.

6. The method of claim 1, wherein the information indicative of context comprises historical or demographic information characterizing the user.

7. The method of claim 1, wherein the information indicative of context comprises the location of the user.

8. The method of claim 1, wherein the second advertiser phone number corresponds to a specific service provided by the advertiser.

9. The method of claim 1, wherein the second advertiser phone number corresponds to a department of the advertiser.

10. The method of claim 1, wherein causing a voice call to be initiated for the user further comprises providing to the advertiser the received information indicative of the context in which the first advertiser phone number was displayed to the user.

11. A computer system for performing context-based call routing to advertisers, the computer system comprising:
a memory for storing programmed instructions; and
a processor configured to execute the programmed instructions to perform operations including:
receiving a first advertiser phone number that is associated with an advertisement;
providing the received first advertiser phone number to an electronic device of a user, wherein the electronic device displays the first advertiser phone number to the user and displays an indication that the user may initiate a voice call to the displayed first advertiser phone number;
receiving a request to initiate a voice call between the user and the first advertiser phone number;
receiving information indicative of the context in which the first advertiser phone number was displayed to the user;
determining, based on the information indicative of the context in which the first advertiser phone number was displayed to the user, a second phone number that is associated with the advertiser; and
redirecting the received request from the first advertiser phone number to the determined second advertiser phone number by initiating a voice call to the determined second advertiser phone number instead of the first advertiser phone number.

12. The computer system of claim 11, wherein the information indicative of context comprises information identifying the user who requested the voice call.

13. The computer system of claim 11, wherein the information indicative of context comprises an identity of a web page on which the first advertiser phone number was displayed or content that was being viewed when the first advertiser phone number was selected.

14. The computer system of claim 11, wherein the information indicative of context comprises the circumstances under which the first advertiser phone number was displayed.

15. The computer system of claim 11, wherein the information indicative of context comprises historical or demographic information characterizing the user.

16. The computer system of claim 11, wherein the information indicative of context comprises the location of the user.

17. The computer system of claim 11, wherein the second advertiser phone number corresponds to a specific service provided by the advertiser or department of the advertiser.

18. The computer system of claim 11, further comprising providing to the advertiser the received information indicative of the context in which the first advertiser phone number was displayed to the user.

19. A computer readable storage medium with instructions stored thereon that, when executed by a computing system, cause the computing system to perform a method for performing context-based call routing to advertisers, the method comprising:
providing a first advertiser phone number associated with an advertisement to an electronic device of a user, wherein the electronic device displays the first advertiser phone number to the user and displays an indication that the user may initiate a voice call to the displayed first advertiser phone number;
receiving a request to initiate a voice call between the user and the first advertiser phone number;
receiving information indicative of the context in which the first advertiser phone number was displayed to the user;
determining, based on the information indicative of the context in which the first advertiser phone number was displayed to the user, a second phone number that is associated with the advertiser; and
redirecting the received request from the first advertiser phone number to the determined second advertiser phone number by initiating the establishment of a voice call with the determined second advertiser phone number instead of the first advertiser phone number.

20. The computer readable storage medium of claim 19, wherein the information indicative of context comprises information identifying the user who requested the voice call, historical information characterizing the user, or demographic information characterizing the user.

21. The computer readable storage medium of claim 19, wherein the information indicative of context comprises an identity of a web page on which the first advertiser phone number was displayed when the first advertiser phone number was selected, content that was being viewed when the first advertiser phone number was selected, or the circumstances under which the first advertiser phone number was displayed.

22. The computer readable storage medium of claim 19, wherein the information indicative of context comprises the location of the user.

23. The computer readable storage medium of claim 19, wherein the second advertiser phone number corresponds to a specific service provided by the advertiser or department of the advertiser.

24. The computer readable storage medium of claim 19, further comprising providing to the advertiser the received information indicative of the context in which the first advertiser phone number was displayed to the user.

* * * * *